US012548391B2

(12) United States Patent
Davis et al.

(10) Patent No.: US 12,548,391 B2
(45) Date of Patent: Feb. 10, 2026

(54) MODIFYING ACCESS CONTROL PERMISSIONS

(71) Applicant: Videx, Inc., Corvallis, OR (US)

(72) Inventors: Tammy A. Davis, Corvallis, OR (US); Michael L. Popenoe, Corvallis, OR (US)

(73) Assignee: Videx, Inc., Corvallis, OR (US)

( * ) Notice: Subject to any disclaimer, the term of this patent is extended or adjusted under 35 U.S.C. 154(b) by 0 days.

(21) Appl. No.: 18/155,284

(22) Filed: Jan. 17, 2023

(65) Prior Publication Data

US 2023/0154255 A1 May 18, 2023

Related U.S. Application Data

(63) Continuation of application No. 17/235,033, filed on Apr. 20, 2021, now Pat. No. 11,580,801, which is a (Continued)

(51) Int. Cl.
*G07C 9/22* (2020.01)
*G07C 9/00* (2020.01)

(Continued)

(52) U.S. Cl.
CPC ......... *G07C 9/00182* (2013.01); *G07C 9/215* (2020.01); *G07C 9/28* (2020.01);

(Continued)

(58) Field of Classification Search
CPC ........... G07C 2009/00246; G07C 2009/00777; G07C 2209/08; G07C 9/00182;

(Continued)

(56) References Cited

U.S. PATENT DOCUMENTS 4,338,526 A 7/1982 Martin et al.
4,712,398 A 12/1987 Clarkson et al.

(Continued)

FOREIGN PATENT DOCUMENTS

EP 2348490 A1 7/2011
EP 2085934 B1 7/2013

(Continued)

OTHER PUBLICATIONS

UTC Fire & Security Americas Corporation, Inc., "eKEY® for Android™ User Manual", Rev May 2, 2011, Supraekey.com, retrieved from the Internet: <URL:http://www.supraekey.com/Documents/ekey-android-uman.pdf>, [available on the Internet at least as early as Jan. 16, 2013].

(Continued)

*Primary Examiner* — Dionne Pendleton
(74) *Attorney, Agent, or Firm* — Matthew D. Eskue

(57) ABSTRACT

Aspects of the disclosure relate to electronic access control. An access control server maintains data associated with a plurality of electronic locks. A user is issued an electronic key for unlocking one or more electronic locks. The user can be assigned to a group. Members of the group are permitted to access a subset of the plurality of electronic locks. A first key configuration is transmitted to the electronic key, the first key configuration permitting the user to access the subset of electronic locks. The access control server accesses personnel data related to the user and determines whether the personnel data satisfies a condition associated with the group. Responsive to determining that the condition is not satisfied, the user is removed from the group and a second key configuration is transmitted to the electronic key, the second key configuration preventing the user from accessing the subset of electronic locks.

18 Claims, 5 Drawing Sheets

Related U.S. Application Data continuation of application No. 16/563,607, filed on Sep. 6, 2019, now Pat. No. 11,010,995.

(51) Int. Cl.
*G07C 9/20* (2020.01)
*G07C 9/27* (2020.01)
*G07C 9/28* (2020.01)

(52) U.S. Cl.
CPC .............. *G07C 2009/00246* (2013.01); *G07C 2009/00777* (2013.01)

(58) Field of Classification Search
CPC ........... G07C 9/00309; G07C 9/00571; G07C 9/215; G07C 9/28; G07C 2009/00865; G07C 2009/0088; G07C 2009/00476; G07C 2009/00587; G07C 2009/00769; G07C 9/00857; G07C 9/00896; G07C 2009/00515; G07C 2209/63; G07C 2209/64; G07C 9/00174; G07C 9/20; G07C 9/27; G07C 9/29; G07C 9/33; G07C 9/257; G07C 9/22; G07C 2009/00412; G07C 2009/00992; G07C 9/00817; G07C 2009/0042; G07C 2009/00507; G07C 2009/00825; G07C 2209/04; G07C 9/00563; G07C 9/0069; G07C 9/21; G07F 5/18; G07F 5/26; G07F 7/02; G07F 9/001; G07F 9/002; G07F 9/026; G06Q 20/18; G06Q 20/327; G06Q 10/107; G06Q 20/02; G06Q 20/023; G06Q 20/04; G06Q 20/12; G06Q 20/1235; G06Q 20/145; G06Q 20/2295; G06Q 20/24; G06Q 20/36; G06Q 20/405; G06Q 20/4097; G06Q 30/02; G06Q 30/0214; G06Q 50/01; G06Q 50/265; G06Q 50/40; G06Q 50/47; G06F 21/6209; G06F 21/77; G06F 2221/2101; G06F 2221/2105; G06F 2221/2111; G06F 2221/2117; G06F 2221/2149; G06F 21/31; G06F 12/1408; G06F 21/109; G06F 21/16; G06F 21/33; G06F 21/55; G06F 21/86; G06F 2211/007; G06F 2221/2115; G06F 2221/2135; G06F 2221/2151; G06F 16/955; G06F 12/0804; G06F 21/602; G06F 2212/1008; G06F 2212/154; G05B 19/02; G05B 2219/24206; G05B 2219/25062; G05B 2219/2613; G05B 2219/40202; E05B 2047/0096; E05B 47/0001; E05B 67/383; E05B 15/0205; E05B 17/22; E05B 17/226; E05B 2047/0058; E05B 2047/0059; E05B 2047/0067; E05B 47/0012; E05B 47/026; E05B 17/0058; E05B 17/0062; E05B 35/08; E05B 35/10; E05B 39/00; E05B 45/06; E05B 47/0623; E05B 47/0661; E05B 47/0673; E05B 67/003; E05B 35/00; E05B 37/00; E05B 41/00; E05B 47/00; E05B 71/00; E05B 69/00; E05B 67/00; E05B 63/00; E05B 61/00; E05B 59/00; E05B 51/00; E05B 49/00; E05B 79/00; E05B 73/00; E05B 77/00; E05B 83/00; E05B 85/00; G07G 1/0054; G06T 1/0021; G06K 7/10366; G01G 19/4144; G01G 23/36; G01G 23/3728; G01C 21/3438; F16P 3/147; E04G 21/32; A61B 3/0091; A61B 3/022; A61B 3/032; A61B 3/113; A61B 5/163; H04L 51/48; H04L 63/083; H04L 63/102; H04L 63/104; H04L 2463/101; H04L 2463/102; H04L 2463/103; H04L 51/18; H04L 51/214; H04L 51/216; H04L 51/224; H04L 51/234; H04L 51/52; H04L 63/04; H04L 63/0428; H04L 63/0815; H04L 63/0853; H04L 63/101; H04L 63/105; H04L 63/108; H04L 63/1416; H04L 63/1441; H04L 63/20; H04L 65/403; H04L 67/1061; H04L 67/306; H04L 67/55; H04L 2463/121; H04L 63/0442; H04L 2209/84; H04L 63/0846; H04L 69/40; H04L 9/3228; H04W 4/021; H04W 4/029; H04W 4/33; H04W 12/03; H04W 12/0471; H04W 12/08; H04W 12/084; H04W 12/106; H04W 12/64; H04N 21/2347; H04N 21/23476; H04N 21/235; H04N 21/2362; H04N 21/2541; H04N 21/2543; H04N 21/2547; H04N 21/25875; H04N 21/4143; H04N 21/4345; H04N 21/435; H04N 21/4405; H04N 21/44204; H04N 21/443; H04N 21/4627; H04N 21/4753; H04N 21/6581; H04N 21/8166; H04N 21/835; H04N 21/8355; H04N 21/83555; H04N 21/8358; H04N 7/162; H04N 7/17309; G21F 3/02; G09G 2380/08; G09G 5/20; G09F 23/00; G08C 17/00; G08C 17/02; G08C 2201/21; G08C 2201/93; G08C 2201/94; G05D 1/0282; B60W 2556/45; B60W 50/00; B60W 60/001; B60R 25/24; G08B 13/08; E05G 1/00; E05G 1/04; Y10T 70/00

See application file for complete search history.

(56) References Cited

U.S. PATENT DOCUMENTS

| | | | |
|---|---|---|---|
| 4,789,859 | A | 12/1988 | Clarkson et al. |
| 4,829,296 | A | 5/1989 | Clark et al. |
| 4,887,292 | A | 12/1989 | Barrett et al. |
| 4,916,443 | A | 4/1990 | Barrett et al. |
| 5,046,084 | A | 9/1991 | Barrett et al. |
| 5,140,317 | A | 8/1992 | Hyatt, Jr. et al. |
| 5,170,431 | A | 12/1992 | Dawson et al. |
| 5,245,652 | A | 9/1993 | Larson et al. |
| 5,280,518 | A | 1/1994 | Danler et al. |
| 5,319,362 | A | 6/1994 | Hyatt, Jr. |
| 5,351,042 | A | 9/1994 | Aston |
| 5,617,082 | A | 4/1997 | Denison et al. |
| 5,745,044 | A | 4/1998 | Hyatt, Jr. et al. |
| 5,815,557 | A | 9/1998 | Larson |
| 6,000,609 | A | 12/1999 | Gokcebay et al. |
| 6,005,487 | A | 12/1999 | Hyatt, Jr. et al. |
| 6,359,547 | B1 | 3/2002 | Denison et al. |
| 6,374,653 | B1 | 4/2002 | Gokcebay et al. |
| 6,472,973 | B1 | 10/2002 | Harold et al. |
| 6,474,122 | B2 | 11/2002 | Davis |
| 6,552,650 | B1 | 4/2003 | Gokcebay et al. |
| 6,564,600 | B1 | 5/2003 | Davis |
| 6,581,161 | B1 | 6/2003 | Byford |
| 6,604,394 | B2 | 8/2003 | Davis |
| 6,615,625 | B2 | 9/2003 | Davis |
| 6,718,806 | B2 | 4/2004 | Davis |
| 6,720,861 | B1 | 4/2004 | Rodenbeck et al. |
| 6,822,552 | B2 | 11/2004 | Lidën et al. |
| 6,822,553 | B1 | 11/2004 | Henderson et al. |
| 6,895,792 | B2 | 5/2005 | Davis |
| 6,900,720 | B2 | 5/2005 | Denison et al. |

(56) References Cited

U.S. PATENT DOCUMENTS 6,937,140 B1 8/2005 Outslay et al.
6,948,070 B1 * 9/2005 Ginter ................ H04N 21/2362 380/231
6,977,576 B2 12/2005 Denison et al.
7,012,503 B2 3/2006 Nielsen
7,019,615 B2 3/2006 Denison et al.
7,145,434 B2 12/2006 Mlynarczyk et al.
7,181,507 B1 2/2007 Lavelle et al.
7,295,100 B2 11/2007 Denison et al.
7,334,443 B2 2/2008 Meekma et al.
7,373,352 B2 5/2008 Roatis et al.
7,456,725 B2 11/2008 Denison et al.
7,471,199 B2 12/2008 Zimmerman et al.
7,482,907 B2 1/2009 Denison et al.
7,495,543 B2 2/2009 Denison et al.
7,600,129 B2 10/2009 Libin et al.
7,606,558 B2 10/2009 Despain et al.
7,683,758 B2 3/2010 Denison et al.
7,706,778 B2 4/2010 Lowe
7,716,489 B1 5/2010 Brandt et al.
7,724,687 B2 5/2010 Autret et al.
7,734,068 B2 6/2010 Fisher
7,741,952 B2 6/2010 Denison et al.
7,821,395 B2 10/2010 Denison et al.
7,822,989 B2 10/2010 Libin et al.
7,999,656 B2 8/2011 Fisher
8,045,961 B2 10/2011 Ayed et al.
8,063,734 B2 11/2011 Conforti
8,074,271 B2 12/2011 Davis et al.
8,102,799 B2 1/2012 Alexander et al.
8,150,374 B2 4/2012 Lowe
8,199,019 B2 6/2012 Kaczmarz et al.
8,232,879 B2 7/2012 Davis
8,260,262 B2 9/2012 Ben Ayed
8,334,765 B2 12/2012 Weinstein et al.
8,368,507 B2 2/2013 Conreux et al.
8,370,911 B1 2/2013 Mallard
8,384,548 B2 2/2013 Knopf et al.
8,427,320 B2 4/2013 Davis
8,473,619 B2 6/2013 Baum et al.
8,482,379 B2 7/2013 Conreux et al.
8,587,405 B2 11/2013 Denison et al.
8,593,252 B2 11/2013 Fisher
8,600,899 B1 12/2013 Davis
8,635,462 B2 1/2014 Ullmann
8,643,487 B2 2/2014 Roatis et al.
8,682,245 B2 3/2014 Fyke et al.
8,689,013 B2 4/2014 Habraken
8,742,889 B2 6/2014 Kaczmarz et al.
8,756,431 B1 6/2014 Despain et al.
8,943,187 B1 1/2015 Saylor
8,970,344 B2 3/2015 Payson et al.
9,509,719 B2 11/2016 Neely
9,512,643 B1 12/2016 Keefe
9,542,785 B2 1/2017 Meganck et al.
9,841,743 B2 12/2017 Davis
9,847,020 B2 12/2017 Davis
10,115,256 B2 10/2018 Davis
10,339,736 B2 7/2019 Sivalingam et al.
10,347,063 B1 7/2019 LaRovere et al.
10,373,486 B2 8/2019 Davis
10,423,136 B2 9/2019 Davis
10,643,414 B2 5/2020 Davis
10,643,461 B2 5/2020 Davis
11,120,658 B1 * 9/2021 Marques ................ G06F 21/31
2002/0180582 A1 12/2002 Nielsen
2006/0045107 A1 3/2006 Kucenas et al.
2006/0136717 A1 6/2006 Buer et al.
2006/0164206 A1 7/2006 Buckingham et al.
2006/0170533 A1 8/2006 Chioiu et al.
2007/0026801 A1 2/2007 Gerstenkorn
2007/0096870 A1 5/2007 Fisher
2008/0136649 A1 6/2008 Van De Hey
2008/0163361 A1 7/2008 Davis et al.
2009/0040014 A1 * 2/2009 Knopf ..................... E04G 21/32 340/5.1
2009/0051486 A1 2/2009 Denison et al.
2010/0300163 A1 12/2010 Loughlin et al.
2010/0328201 A1 12/2010 Marvit et al.
2011/0191126 A1 8/2011 Hampshire et al.
2011/0276609 A1 11/2011 Denison
2011/0289123 A1 11/2011 Denison
2011/0311052 A1 12/2011 Myers et al.
2012/0011366 A1 1/2012 Denison
2012/0011367 A1 1/2012 Denison
2012/0114122 A1 5/2012 Metivier
2012/0126936 A1 5/2012 Harkins et al.
2012/0135680 A1 5/2012 Deluca
2012/0166255 A1 * 6/2012 Rizk ...................... G06Q 30/02 709/204
2012/0169461 A1 7/2012 Dubois, Jr.
2012/0213362 A1 8/2012 Bliding et al.
2012/0222103 A1 8/2012 Bliding et al.
2012/0280783 A1 11/2012 Gerhardt et al.
2013/0024222 A1 1/2013 Dunn
2013/0027177 A1 1/2013 Denison
2013/0099892 A1 4/2013 Tucker et al.
2013/0176107 A1 7/2013 Dumas et al.
2013/0179005 A1 7/2013 Nishimoto et al.
2013/0187756 A1 7/2013 Fisher
2013/0214901 A1 8/2013 Pineau et al.
2013/0234836 A1 9/2013 Davis
2013/0326595 A1 12/2013 Myers et al.
2014/0202220 A1 7/2014 Denison et al.
2014/0266573 A1 9/2014 Sullivan
2014/0365781 A1 12/2014 Dmitrienko et al.
2015/0235497 A1 8/2015 Voss
2015/0247643 A1 9/2015 Bebon et al.
2015/0287256 A1 * 10/2015 Davis ................. G07C 9/00309 340/5.25
2015/0348344 A1 12/2015 Rettig et al.
2017/0032602 A1 2/2017 Cheng et al.
2018/0245839 A1 8/2018 Denison et al.
2019/0188940 A1 6/2019 Kanoria
2019/0213814 A1 7/2019 Han
2019/0361414 A1 11/2019 Davis
2020/0258335 A1 8/2020 Davis
2020/0258378 A1 8/2020 Davis
2021/0256783 A1 8/2021 Davis et al.
2023/0154255 A1 * 5/2023 Davis ....................... G07C 9/28 340/5.64

FOREIGN PATENT DOCUMENTS

WO 2004092514 A1 10/2004
WO 2006082526 A1 8/2006
WO 2008076074 A1 6/2008
WO 2012073265 A1 6/2012
WO 2012097917 A1 7/2012
WO 2015001009 A1 1/2015

OTHER PUBLICATIONS

Videx, Inc., "CyberAudit-Web Professional Reference Manual, Version 1.1", MN-CYA-08, Cyberlock.com, retrieved from the Internet: <URL:http://www.cyberlock.com/assets/cyberaudit-web-pro-manual.pdf>, [available on the Internet at east as early as Feb. 9, 2013].

* cited by examiner

MODIFYING ACCESS CONTROL PERMISSIONS

RELATED APPLICATIONS

This application is a continuation of U.S. patent application Ser. No. 17/235,033 entitled "ACCESS CONTROL SYSTEM WITH DYNAMIC ACCESS PERMISSION PROCESSING" and filed Apr. 20, 2021, now allowed, which is a continuation of and claims priority to U.S. patent application Ser. No. 16/563,607, also entitled "ACCESS CONTROL SYSTEM WITH DYNAMIC ACCESS PERMISSION PROCESSING" and filed on Sep. 6, 2019, now U.S. Pat. No. 11,010,995 issued on May 18, 2021. The disclosures of the foregoing applications are incorporated by reference herein in their entirety.

BACKGROUND INFORMATION

Aspects of the disclosure relate generally to electronic access control. Electronic access control systems may include one or more electronic locking devices. In such systems, electronic locking devices can be used to control access to areas, enclosures, resources, and items. For instance, electronic locking devices can restrict physical or bodily access to an area or enclosure by interacting with traditional doors, gates, or barriers. Electronic locking devices may also be configured to restrict access to or use of items, such as computer terminals, heavy equipment, valves, or light sources. Electronic keys can be configured to unlock or operate an electronic locking device based on the exchange of an access credential, such as a password, or other access control information.

BRIEF DESCRIPTION OF THE DRAWINGS

Aspects of the disclosure are illustrated by way of example, and not by limitation, in the accompanying figures in which like reference characters indicate like elements, and wherein.

DETAILED DESCRIPTION

Figure 1:
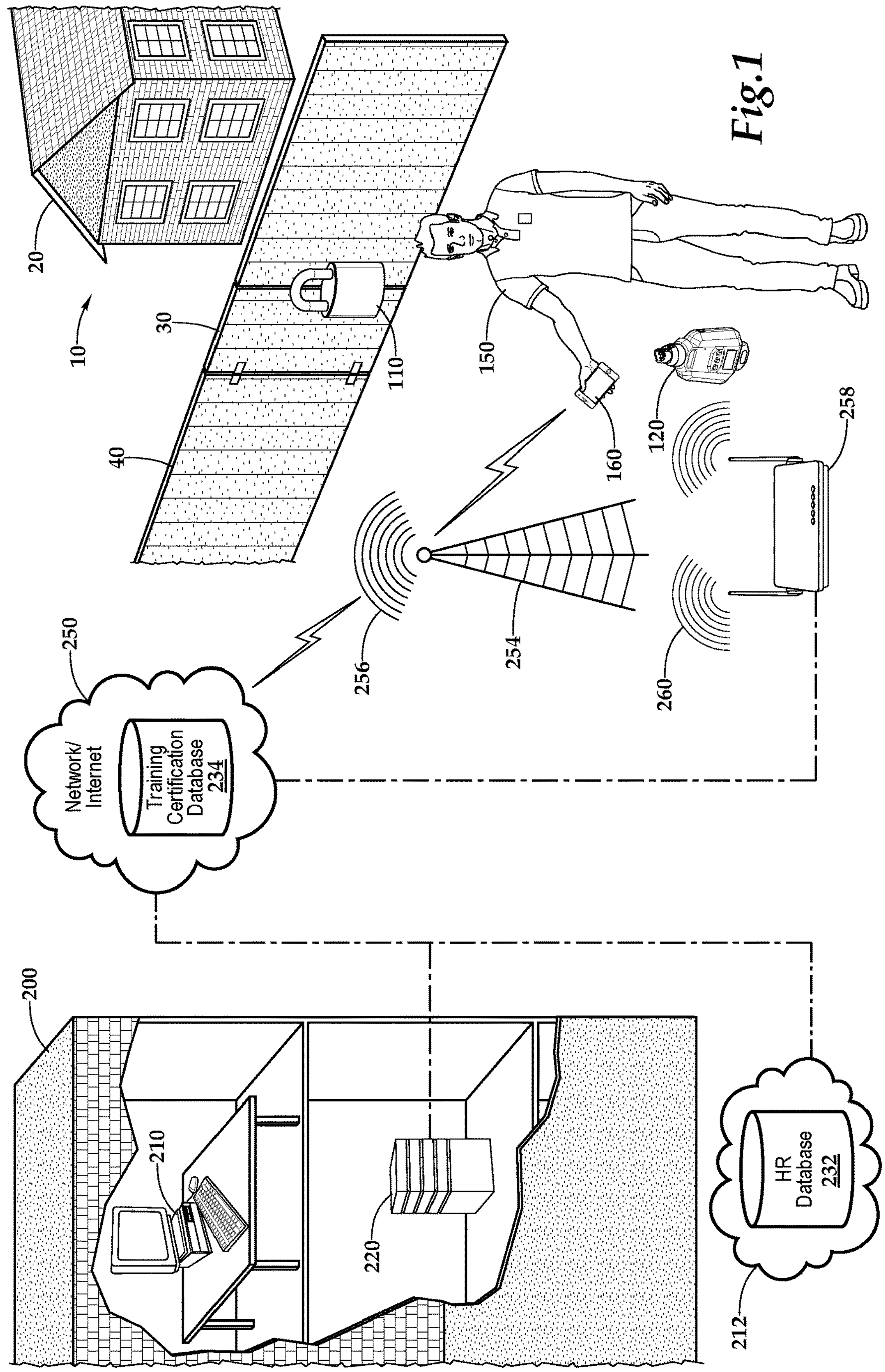
FIG. 1 is a drawing illustrating an example access control system for managing user access to a resource comprising a property and building.

In the following description, reference is made to the accompanying drawings identified above and which form a part hereof. The accompanying drawings and description provide examples of the various aspects. It is to be understood that the example embodiments depicted in the drawings and/or described are non-exclusive and that other embodiments and implementations may be practiced without departing from the spirit or scope of the subject matter presented. Many of the disclosed features and associated components can be used independently of others, and can be implemented differently than described herein. Further, skilled persons in the relevant art will recognize that the embodiments may be practiced without one or more of the specific features or elements of a particular embodiment. In some instances, additional features and advantages may be recognized in certain embodiments that may not be present in all embodiments. Accordingly, nothing in this detailed description (or in the preceding background and summary sections) is intended to imply that any particular feature, element or characteristic of the disclosed systems is essential.

Some aspects of the subject matter may be implemented in an entirely hardware embodiment, as an entirely software embodiment (including firmware and other variations), or as embodiments combining hardware and software aspects and which may all generally be referred to herein as a "circuit," "module" or "system." Furthermore, aspects may take the form of a computer program product embodied in one or more non-transitory computer readable medium(s) having computer readable program code (also referred to as machine code) embodied thereon.

In conventional electronic access control systems, access is generally granted based on authentication of an access credential. For instance, if an electronic key delivers valid access credential information to an electronic locking device, the locking device will permit the carrier of the electronic key to access the area, enclosure, or item. In such conventional arrangements, the electronic locking device behaves, from the user's perspective, in a manner akin to a traditional mechanical lock and key. However, such systems may inadvertently grant access to an unauthorized person or to a resource that is unavailable or malfunctioning. For example, if an unauthorized party gains access to a key programmed with a valid access credential, the electronic locking device may grant access to the unauthorized party based on authentication of the access credential. Such methodologies present various security risks for an access control system.

This disclosure is generally directed to an access control system including one or more electronic locking devices for restricting or controlling access to an area, enclosure, resource, or item. In the context of this disclosure, "electronic locking device," "locking device," "electronic lock", and similar terms are used interchangeably and do not limit the locking device in any manner, or to any particular hardware elements or configuration. An electronic key can interface with the electronic lock and access control information may thereby be exchanged between key and lock. Exchange of access control information between lock and key may initiate access control events, such as an unlocking event whereby a user of the electronic key is granted access to the area, enclosure, resource, or item secured by the locking device. Other access control events may include access denied events, configuration events, download events, and other types of events as further described in this disclosure. Details of access control events can be generated and recorded in memory sites of the lock, key, and other access control devices. Details of access control events are also referred to as an audit trail. Audit trail information can be generated for each device or user in the access control system, and often includes a record of unlocking events, access denied events, timestamps, user and device identifiers, battery levels, error messages, and other information.

An electronic key may convey authentication information to the electronic lock in connection with initiating an unlocking event, or in relation to other access control events. Authentication information may be considered a subset of access control information, specifically related to the authentication of a user or device. Authentication of devices may also be performed prior to initiating a configuration event, download event, or other access control events. Authentication information may include an access credential. However, it will be appreciated that authentication information can comprise any data that can be received and processed by the access control devices described herein to facilitate an authentication operation. An access credential can include information such as access codes (e.g. binary string), passwords, and device identifiers, to identify just a few specific examples. This disclosure may refer to authentication information as simply a credential or access credential.

The access control system further includes an access validation engine for processing information related to access control events. In conventional access control systems, for example hardwired systems comprising powered RFID readers, access to a resource is generally granted based solely on presentation of a valid access credential. If a system administrator in such conventional systems wishes to restrict access to a user, the administrator must manually modify or revoke the user's access credential. In some aspects of the present disclosure, access to resources may be granted or denied based on certain supplemental information or conditions, in addition to the user presenting a valid access credential. The access validation engine may, for example, process access control information that is supplemental to or independent of authentication information. Certain aspects of this disclosure provide a more responsive access control system. For instance, in some implementations, supplemental information can be processed dynamically, with the access validation engine adjusting access to resources periodically, or in real-time (e.g. contemporaneously with an access control event).

In various embodiments, the access validation engine may process information to determine or verify whether or not the current user of an electronic key should be granted access to a resource. In some instances, the access validation engine determines if access should be granted independently of the electronic key possessing (e.g. stored in memory) a valid access credential. It will be appreciated by skilled persons that rules or logic defining access to a resource can be associated with devices, for instance an electronic key programmed with a valid access credential may access resources regardless of the particular user of the key. Access rules may also be associated with specific users, and devices, such as an electronic key, may be assigned to users and configured to adjust permissions based on the particular user. In some implementations, users may share keys. In other implementations, each user may be issued his or her own key. In further examples, the validation processes performed by the access validation engine are independent of and may even override or supersede access permissions defined by the system administrator. In other words, access to a resource may be granted based on both the electronic key having a valid access credential (for presentation to the lock) and the access validation engine determining that the key's user is authorized to access the resource. As such, access can be denied to a user that obtained a key through improper channels, such as by stealing the key from its assigned user. Access validation engine can process and validate access events for different purposes.

To illustrate, a system administrator may grant a user access to a particular resource, such as a building entrance, by issuing an electronic key to the user that includes (in memory sites of the key) the necessary authentication information to operate the building entrance lock. However, if the user loses the key and an unauthorized individual attempts to access the building entrance with the lost key, the user validation engine may deny access, for example based on information associated with the current holder of the key. Accordingly, in such implementations the key may capture biometric data or other identifier from the user to facilitate processing and validation of an access event. The access validation engine may process other forms of access control information, including data associated with the electronic lock, with a resource, with a user, or combinations thereof. In some embodiments, an electronic key may forego attempts to transmit or use an access credential stored in memory sites of the key unless or until the access validation engine determines that access to the resource should be granted. In this general manner, various aspects described herein provide improved security and responsiveness with respect to electronic access control systems.

The access validation engine can be configured to process a variety of different information types in connection with validating an access control event. For instance, access validation engine may be configured to process information generated by or received from various access control devices deployed in access control system. In some embodiments, access validation engine may be configured to process information generated by or received from a device or resource that is part of or associated with another system, for example a human resources database. It will be appreciated by skilled persons that various other types of information can be employed by access validation engine without departing from the scope of this disclosure. In certain embodiments, access validation engine can be configured to process multiple different types of information in connection with evaluating an access control event. In some instances, access validation engine may process of a plurality of information types associated with the key holder prior to authorizing initiation of the access event. In other instances, access validation engine may authenticate a plurality of information types associated with the user and the particular resource the user is attempting to access. In this manner, security can be enhanced by referencing a plurality of information types in connection with granting a user access to an area or resource secured by an electronic locking device.

As a general introduction to the subject matter described in more detail below, an access control system may comprise various types of access control devices. In addition to the electronic lock and electronic key briefly introduced above, access control devices may include, but are not limited to, card readers, biometric sensors (e.g. fingerprint scanners, retina scanners, or facial recognition imagers), motion detection sensors, cameras, geolocation sensors, alarm devices, keypad input devices, smartphones and other commercially available consumer electronics, and networking devices to facilitate the exchange of access control information across the various devices. Skilled persons will appreciate that these illustrative examples of access control devices are offered to aid in understanding the broad category of devices that can be deployed in connection with an access control system. Other types of devices can be used without departing from the scope of this disclosure.

Electronic locks can be configured to restrict access to an extensive range of areas, items, and enclosures. In some instances, electronic locks may even be implemented in configurations to restrict access to a computer application or software element, or to change the state of an electronic device, for example by delivering or interrupting power to a light or alarm. For brevity, and unless the context expressly prescribes otherwise, areas, items, enclosures, and the like may all be referred to in this disclosure as "resources." Accordingly, resources may include areas such as buildings, property, parking structures, campuses, stadiums, and the like. Resources further include items such as equipment, computer consoles, electronic switches, electronic devices, lights, alarms, software applications, and other items. Resources also include enclosures such as server racks, cabinets, lockers, rooms, offices, closets, and other enclosed or confined spaces. Skilled persons will recognize that the diversity of resources that may be secured by an electronic lock necessitate that the definition of electronic lock is not limited to any particular hardware or software configuration and that an electronic lock may be implemented in any manner suitable for restricting a user's access to one or more resources.

Referring now to FIG. 1, an example access control system is illustrated in accordance with some embodiments. Access control system 100 may generally be configured to secure one or more resources. In the illustrative example shown in FIG. 1, access control system 100 is depicted in connection with a secured property 10, and a secured facility 20 situated thereon. Access control system 100 may facilitate the selective granting of access to resources such as secured property 10. Access may be granted, for instance, to permit a user 150 to access items or perform a service inside secured facility 20. In accordance with some embodiments, electronic lock 110 can secure a gate 30 that facilitates user movement across fence 40 for access to the secured property. Additional locking devices can be implemented as desired in access control system 100, for example to secure an access point (e.g. door) of facility 20 whereby user 150 can initiate an unlocking event at each of a plurality of locking devices in order to gain access to the desired resource.

In various embodiments, access control system 100 can regulate access to resources that are dispersed across a broad geographical region, such as a county or state. In other various embodiments, access control system 100 can secure resources within a city, campus, or single building. Skilled persons will appreciate and understand that access control system 100 can be embodied in any configuration most appropriate for the resources that are to be secured. In some instances, access control system 100 may secure a single room or enclosure within a building.

Access control system 100 may further include an electronic key 120 and a smart device 160, as shown in FIG. 1. A user 150 can carry one or both of electronic key 120 and smart device 160. Smart device 160 may be implemented as a commercially available smartphone or tablet, or similar electronic device. As used in this disclosure, the term "smart device" refers to a network device that is generally connected to other devices or networks and can operate to some extent interactively and autonomously. Examples of smart devices include smartphones (e.g. Apple iPhone, Android phones, etc.), tablets and phablets (e.g. Apple iPad, Amazon Kindle, Google Nexus, Samsung Note etc.), smart watches (e.g. Apple Watch, Samsung Gear, etc.), personal desktop computers, and laptop computers, to identify a few specific, commercially available electronic devices.

As illustrated, access control system 100 may also include an access control center 200, access control terminal 210, access control server 220, and databases, in this example human resources ("HR") database 232 and training certification database 234, that comprise information associated with access control system 100. Skilled persons will appreciate that the configuration of hardware and resources depicted in FIG. 1 is illustrative only and will understand that this example does not limit access control system 100 to the particular configuration or the number or type of devices shown and described.

Access control center 200 may be located away from secured property 10, as shown in FIG. 1. It will be appreciated that access control center 200 may, in some implementations, be in the same room, building or facility as the resource(s). In accordance with some embodiments, access control center 200 may comprise access control devices (or other combinations of hardware and software aspects) configured to operate as, or part of, an administration system for controlling, monitoring, or distributing information to other devices in the access control system 100. For example, aspects of access control center 200 may be employed by a supervisor or manager to perform administrative tasks related to management of system resources (e.g. changing permissions, adding and deleting users, and the like).

Access control terminal 210, for instance, can facilitate display of access control information, for example for monitoring of access control devices such as electronic key 120 and electronic lock 110. Terminal 210 may also receive input via an access control user interface, for instance to process modifications of access control information, or to add devices or users. Access control terminal 210 can be a conventional desktop computer, terminal, wall panel, kiosk, or other electronic device capable of displaying access control information and receiving input from a user or administrator. A user can perform certain administrative tasks and duties via the user interface and I/O features of the terminal. Access control terminal 210 can be communicably coupled to access control server 220 and may further exchange data with the other access control devices via the methods and protocols described herein.

Access control server 220 can be a system server configured to maintain, process, and/or deliver access control information to the various devices in access control system 100. Server 220 can comprise any combination of hardware and software elements configured to process and distribute access control information for access control system 100. Access control devices, such as electronic key 120 and smart device 160, can operate in a client-server relationship with server 220, in accordance with at least one embodiment. Different methodologies for exchanging information with access control devices are possible. Access control server 220 can be implemented as a computer server (e.g., FTP servers, file sharing servers, web servers, etc.) or combinations of servers (e.g., data centers, cloud computing platforms, etc.). However, skilled persons will recognize that other server architectures are suitable for carrying out the features described in this disclosure.

Access control server 220 can comprise or have access to an access control database, or other repository of access control information. The access control information may be reviewed, managed, and/or modified by a system administrator. In some implementations, users can modify access control information associated with certain devices. Access control server 220 can locate, process, and enrich access control information for various purposes. In some instances, access control server 220 can authenticate users or devices prior to initiating delivery or exchange of data.

Access control center 200 is illustrated as including access control terminal 210 and access control server 220, however skilled persons will appreciate that access control devices can be arranged or distributed in many different ways. In some implementations, for instance, access control terminal 210 is a portable device (e.g. smartphone or laptop) carried by a system administrator and communicably coupled to server 220 and other devices via wired or wireless networks. In other implementations, smart device 160 can perform one or more operations described with respect to terminal 210 and server 220, such as providing an administrator or supervisor with a user interface and input device to monitor and adjust access control information, and/or providing memory sites for maintaining the access control information. In other implementations, server 220 can be implemented as a cloud service and made available to users and devices of access control system 100 via an Internet connection.

Network communication paradigms can facilitate the exchange of access control information between the various devices distributed throughout access control system 100. In accordance with various embodiments, communications between access control devices in the system can be facilitated by one or more communication networks, such as the Internet, local area networks ("LAN"), wide area networks ("WAN"), personal area networks ("PAN"), virtual private networks ("VPN"), controller area networks ("CAN"), wired networks, wireless networks, satellite networks, mobile data networks, or any combination thereof. One or more communication networks are represented in FIG. 1 by way of network 250. It will be appreciated that network 250 is depicted in FIG. 1 as a single network to help facilitate concise illustration, and that network 250 can comprise, for example, one or more wireless networks, one or more wired networks, or a combination or series of wired and wireless networks. For instance, FIG. 1 further depicts networking devices configured for wireless communications via network 250, including a cellular network transceiver 254, for providing a cellular LTE wireless wide area network ("WWAN") 256, and a wireless router device 258, for providing a Wi-Fi wireless local area network ("WLAN") 260. FIG. 1 also includes, for example, HR database 232 made accessible (e.g. connected) to server 220 and network 250 via a LAN 212 associated with access control center 200. For brevity, and unless context expressly dictates otherwise, reference to network 250 in this disclosure shall be understood to include network communications provided by WWAN 256, WLAN 260, the Internet, and any other network communication links described herein. The exchange of access control information facilitated by network 250 will be described in greater detail below.

Electronic lock 110 may be any locking device controlled, at least in part, by electrical signals and capable of restricting access to a resource, such as an access point, enclosure, area, or electronic device. Examples of various suitable electronic locking devices are described in U.S. Pat. Nos. 5,140,317, 5,351,042, and 6,474,122, to identify just a few. As illustrated by FIG. 1, electronic lock 110 may be embodied as an electronic padlock device configured to secure a gate (e.g. for selectively permitting access through a wall or fence). The padlock hardware embodiment shown in FIG. 1 is but one example and is provided here for illustrative purposes only. Access control system 100 may include other implementations of electronic lock 110, for example mortise locks, rim locks, safe locks, electronic switch locks or other circuits for controlling the power supply of an associated device, and the like.

Skilled persons in the art will understand that electronic lock 110 can be embodied in a wide variety of configurations depending on the associated resources and that combinations of locking hardware and electronic components (including software/firmware for controlling operation therefor) may be implemented as necessary to restrict access to a resource. For instance, electronic lock 110 may comprise hardware elements for restricting movement of a door (e.g. a deadbolt). In other aspects, electronic lock 110 may be configured to control or displace a separate blocking element, such as a liftarm, barrier, or turnstile. Elements of an electronic locking device can be situated away from one another and communicably coupled to facilitate the access operations described herein. For example, a communication interface for authenticating a user (e.g. reader, key receptacle) and a blocking element for restricting user access to a resource may be implemented separately and communicably coupled to facilitate the operations for permitting user access to the resource. To illustrate, a blocking element for restricting user access can be operatively coupled to a door. The blocking element may comprise a deadbolt, door strike or other hardware element designed to resist movement of the door. Meanwhile, elements for authenticating access, such as a card reader or lock controller, may be mounted in another area and configured to deliver an electrical signal to cause displacement of the blocking element and unlock the door.

In yet another example, an electronic locking device can be implemented as one element of a system designed to manage the flow of people in a large area (e.g. a turnstile at an arena or a barrier gate at a parking garage). In further examples, an electronic locking device can be integrated with and restrict access to a small enclosure (e.g. an electronic locking system in an automobile or a gun safe). Electronic lock can be configured to interface with or otherwise communicate unlocking or locking commands to an input device for the system, such as a microprocessor or door controller device that is designed to cause delivery of electrical power for actuating the hardware restricting user access. Persons of skill will appreciate that electronic lock 110, in conjunction with cooperative lock hardware, can be configured to simulate the mechanical operation of known, commercially available locking cylinders, such as those commonly found on residential and commercial doors. Other locking device implementations will be apparent to skilled persons.

According to various embodiments described herein, an electronic key 120 may be configured to transmit or present information to electronic lock 110 to initiate an unlocking event and thereby permit a user 150 of the key to access the secured resource. For example, electronic key 120 can convey information, such as an access credential, to electronic lock 110 via a lock interface 115 to initiate an unlocking event at the lock. Electronic key 120 can facilitate further events at electronic lock 110, for example configuration events for modifying lock operations or behavior.

Various methods and techniques for communicating with and/or controlling operation of an electronic lock are known in the field of electronic locks. One example of a reliable method is that described in the aforementioned '122 patent assigned to Videx, Inc., assignee of this disclosure. As illustrated in greater detail in the '122 patent, operation and/or unlocking of an electronic lock may be initiated by transmitting an access credential comprising a unique identification code and password, stored in memory of an electronic key, to the electronic lock. The electronic lock may then compare the received credential (e.g. identification code and password) against a list of valid credentials maintained in memory of the electronic lock. If the credential provided to the lock is valid, the electronic locking device may thereafter be unlocked, granting access to the secured resource. It will be appreciated that other known methods and techniques for operating an electronic lock may demand additional information for further defining the credential, for example time and/or date constraints that limit the period during which a key is authorized to operate a lock. In other implementations, data can be exchanged between lock and key in different ways. For instance, the electronic lock may be configured to transmit credential data to the key, and the key may perform certain authentication operations prior to initiation of the unlocking event. In accordance with various methods and techniques, the electronic key may store a record of successful and/or unsuccessful access control events (i.e. audit trail) in memory of the electronic key. Likewise, an audit trail may be stored in memory of the electronic lock.

Access control system 100 may comprise an expansive range of access control devices and skilled persons will appreciate that the term "access event" refers to any recordable event associated with an access control device. Depending on the arrangement and characteristics of access control system 100, access control events may include an unlocking event (e.g. successfully unlocking an electronic locking device to permit user access to a resource); a denied access event (e.g. denying a user access to an electronic lock, such as by electronic key foregoing an attempt to transmit an unlocking signal or by electronic lock foregoing an attempt to perform unlocking operations upon receipt of invalid credential data); a biometric capture event (e.g. where the system includes a fingerprint scanner or retinal scanner that captures biometric data of a user); a movement event (e.g. a verified movement of electronic key or a user from one location to another within the system); and a download event (e.g. transferring access event information from one device to another, such as from electronic lock 110 to electronic key 120). These access control events illustrate just a few possible examples. Other types of access control events can be identified and recorded by the various access control devices. It will be appreciated that details of access control events can include additional information, including timestamps, device identifiers, user identifiers, results of the event, error or malfunction information, battery levels, pattern information, and other data relating to the access control devices, users, or other access control system components. Details of access control events can be exchanged or processed for various purposes, whether contemporaneously with the event or at a later time.

Skilled persons will appreciate that various methods, techniques, and protocols for operating and communicating with an electronic locking device may be employed by access control system 100. In this manner, lock interface 115 may be implemented as a wired communications link, wireless communications link, or combinations thereof utilizing any suitable communications protocols described in this disclosure. Aspects of interfacing with and/or operating an electronic lock via a wired communications link are disclosed for example in U.S. Pat. Nos. 5,140,317 and 6,474,122 (cited above). Aspects of interfacing with and/or operating an electronic lock via a wireless communications link are disclosed for example in U.S. Pat. Nos. 5,815,557 and 7,334,443. Skilled persons will understand that these are but a few examples and that other methods and hardware configurations can be employed to facilitate operation of electronic lock 110.

Electronic lock 110 may be configured without access to a power source, in accordance with embodiments of this disclosure. As such, electrical power to energize circuitry of the electronic lock may be provided by a power source (e.g. lithium battery) of electronic key during an unlocking event or during other key-to-lock communications. Such systems comprising unpowered locks are often referred to as key-centric systems. Key-centric systems may be differentiated from conventional hardwired access control systems that feature locking devices configured with a dedicated source of power and persistent communication link. In many scenarios, installation or configuration of a conventional hardwired system is not practical due to costs or structural constraints. However, in key-centric systems, electrical power may be supplied to energize circuitry of an electronic lock during engagement with an electronic key, for example via electrical contacts (where electrical contacts on an electronic key may be electrically coupled with corresponding electrical contacts on the electronic lock) or by other known methods, such as inductive coupling wherein electronic key and electronic lock may both include compatible inductive coupling circuitry. Accordingly, an electronic lock in such key-centric implementations may be energized during periods when it is communicating with other access control devices, for example with an electronic key for the purpose of effectuating operations to facilitate an unlocking event. It will be understood that electronic lock can be configured to remain in a secure position whether or not the lock has access to a source of power. In some instances, a user may be required to manually secure the electronic lock following an unlocking event. In other examples, the lock may be configured to electronically secure the resource prior to disengagement with the power source (e.g. removal of electronic key).

While access control system 100 may comprise various configurations of electronic locking devices for securing the desired resources, aspects of this disclosure are described in the context of an electronic lock configured without access to a power source. In implementations of electronic lock 110 that do not include a dedicated power source and communication link, access administration can present a challenge. Various aspects of this disclosure provide a more dynamic and responsive key-centric system that addresses some of the challenges of conventional key-centric implementations.

Accordingly, examples of lock interface 115 are described herein as a wired communications link (or combination of wired and wireless) configured such that a power source of electronic key 120 may energize circuitry of electronic locking device 110. As used with respect to lock interface 115, the term "wired communications link" does not signify a permanent electrical connection between lock and key; rather, physical engagement (i.e. mechanical coupling) or relative proximity between electronic key 120 and electronic lock 110 may facilitate the energizing of circuitry within electronic lock 110, for example via corresponding electrical contacts disposed on both key and locking device. It will be understood that the term wired connection may be temporary, for instance being established only during periods when the electronic key is coupled to the lock to initiate an access control event. Indeed, presence of a permanent wired connection between lock and key would be indicative of a conventional hardwired system, and not a key-centric system. In addition to energizing lock circuitry, in certain implementations lock interface 115 may be further configured to electronically transmit access control information, including an access credential, to electronic lock 110. However, it will be appreciated that lock interface 115 may be implemented according to other communications paradigms, including for example as a wireless communications interface that may additionally energize circuitry within electronic locking device 110 via inductive coupling or other methods of wireless energy transfer. Or, alternatively, lock interface 115 may be implemented using a combination of wired and wireless elements (e.g. data may be communicated via a wireless signal and power transferred via a wire or electrical contact, and vice versa).

Figure 2:
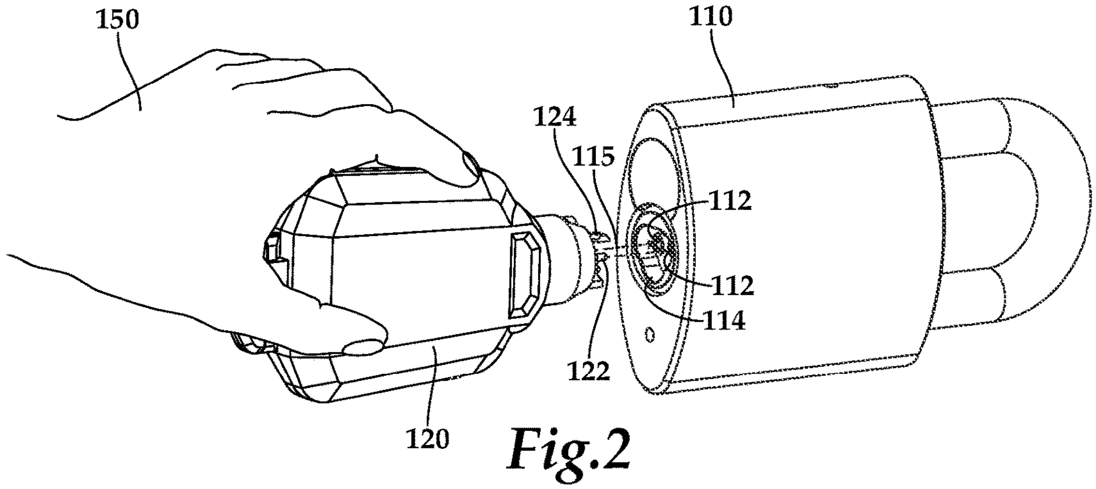
FIG. 2 is a perspective view illustrating a user positioning an example electronic key to facilitate communications with an example electronic lock, wherein the electronic lock comprises a padlock-style housing.

In accordance with one or more aspects of this disclosure, an example electronic key and example electronic lock are illustrated generally in FIG. 2. Skilled persons will understand that the examples depicted in FIG. 2 are selected from an expansive set of possible hardware elements and configurations. In the spirit of brevity, this disclosure does not describe other example lock and key implementations in detail. Various features, such as communications paradigms, are described primarily in the context of the example embodiments presented herein, however the disclosure is not intended to be limiting with respect to other possible implementations.

An example electronic key 120 may comprise electrical contacts 122, as illustrated by FIG. 2. Electrical contacts 122 may be partially enclosed within a key tip 124 (cut away in FIG. 2 to better illustrate electrical contacts 122), for example to protect the contacts from damage. Other configurations without a key tip are possible. For instance, in some implementations, electrical contacts or inductive circuitry are disposed within a traditional mechanical key blade or the like. In yet other implementations, electrical contacts may be arranged flush against the surface of the key. Different configurations may have utility in other implementations and embodiments.

The example electronic lock 110 depicted in FIG. 2 comprises corresponding electrical contacts 112. In this manner, lock interface 115 can comprise a (temporary) wired electrical connection, established during periods when electronic key 120 is presented to electronic lock 110 in a manner facilitating alignment (i.e. contact) of electrical contacts 112 and 122. FIG. 2 shows example electronic key 120 and example electronic lock 110 each comprising corresponding male-female “engagement elements.” Engagement elements, including key tip 124 and key receptacle 114, may assist with alignment of electrical contacts and/or permit a user to physically manipulate (e.g. manually rotate) electronic lock 110. Engagement elements may facilitate other features or operations. It will be apparent to skilled persons that engagement elements can include different or additional elements, for example in some implementations engagement elements may comprise a traditional mechanical key blade and corresponding mechanical keyway. In other embodiments, engagement elements may be omitted entirely.

Skilled persons will understand that electronic lock 110 may comprise a wide range of locking mechanisms and other hardware elements for restricting access to a resource. This disclosure will only address a few of the possible examples. For instance, electronic lock 110 can include padlock hardware, as depicted in FIGS. 1 and 2. This non-limiting example is provided to offer a more complete understanding of the disclosure and different locking configurations are possible, some of which are identified briefly elsewhere. In the present example, electronic lock 110 may include a locking mechanism (e.g. locking pin, ball bearing, disc, etc.) inside the lock body (not shown in FIG. 2) that, in a locked state, resists rotation of the lock cylinder and/or resists disengagement of the padlock shackle. In an unlocked state, however, the internal locking mechanism can be displaced to permit rotation of the lock cylinder or otherwise disengage the shackle from the padlock body. Other embodiments may comprise different or additional lock hardware. For instance, in a cam lock embodiment of electronic lock 110, rotation of the lock cylinder during an unlocking event may cause displacement of a plate or other element on the rear of the locking device.

In other aspects, manipulation of the locking device during an unlocking event may cause displacement of a deadbolt, or actuate an electronic switch or magnetic strike. Electronic lock 110 can be configured to actuate or displace any element designed to restrict access to a resource. For example, electronic lock 110 can be configured to restrict movement of a turnstile or lift barrier. An unlocking event at electronic lock 110 can include displacement of mechanical elements (e.g. latch or deadbolt), actuation of electronic components (e.g. electrical switch or signal), or a combination of mechanical and electronic (e.g. displacement of latch and delivery of electrical signal). For instance, an unlocking event at electronic lock 110 may generate or cause delivery of an electrical signal that changes the state of an electronic component, such as a light, magnetic strike, power switch, alarm or the like.

Referring still to FIG. 2, other example implementations may include electrical contacts disposed in various positions on the lock and key, respectively. In accordance with various embodiments, lock interface 115 can further transfer electrical power from the key to the lock by way of electrical contacts 122 and electrical contacts 112. Skilled persons will understand the lock and key can include electrical contact elements in any practical arrangement that facilitates power and/or data transfer as described with respect to lock interface 115. Other communications and power transfer paradigms can be implemented in one or both of electronic key and electronic lock.

In some embodiments, electronic lock 110 and electronic key 120 may include a port or receptacle to facilitate implementation of lock interface 115 with a cable. For example, electrical power and/or data can be conveyed across lock interface 115 via a Universal Serial Bus (“USB”) cable or other wired connection. In accordance with various other embodiments, electronic key 120 and electronic lock 110 each include inductive coupling circuitry to facilitate implementation of lock interface 115, whereby data and/or power can be transferred between key and lock via electromagnetic field. In such inductive coupling implementations of lock interface 115, electronic key 120 and electronic lock 110 may include wireless power transfer circuitry that is fully enclosed inside the body of the key and lock, or otherwise coated with or encased in a protective material, for instance to better shield the circuitry from debris or damage. Skilled persons will understand that different wired and wireless power transfer techniques are within the scope of this disclosure, examples of which include power transfer circuitry configured in accordance with the Qi standard, radio frequency circuitry, and resonant frequency circuitry.

Figure 3:
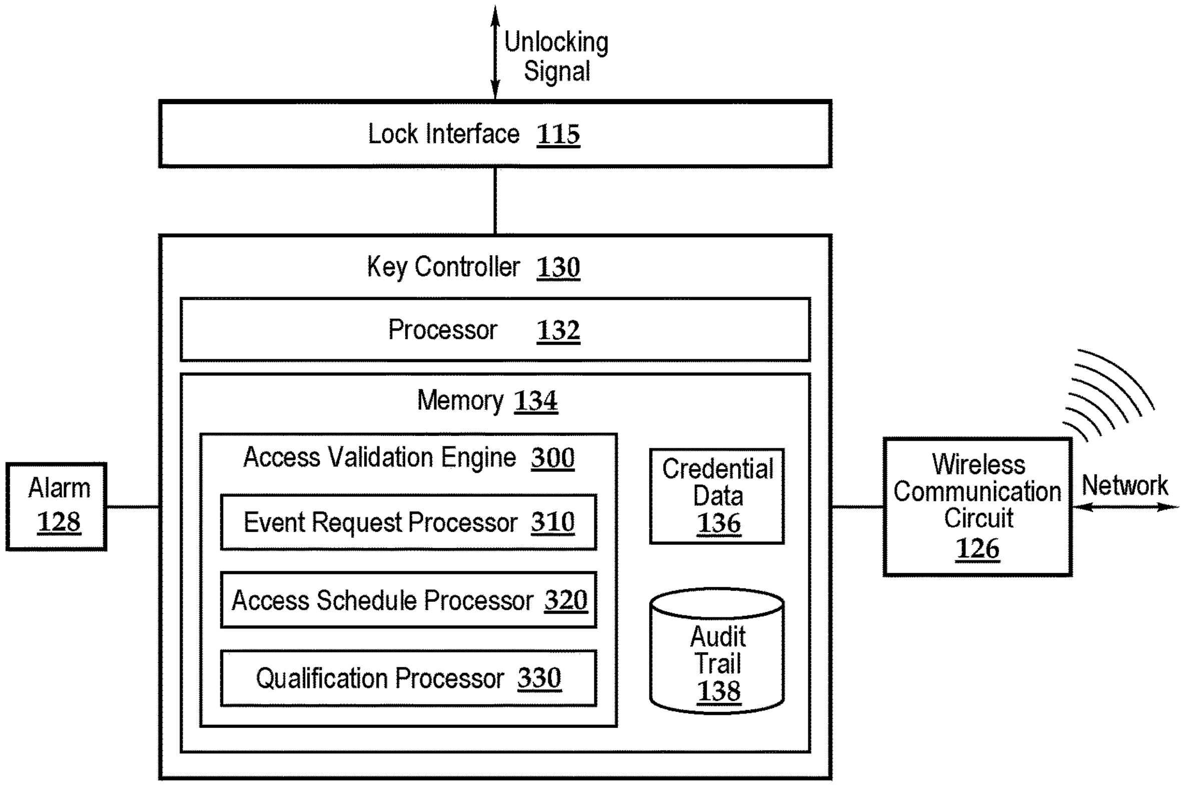
FIG. 3 is a block diagram illustrating an example electronic key and further illustrating example communication interfaces between the electronic key and access control devices.

Turning now to FIG. 3, a block diagram of an example electronic key 120 is shown, in accordance with some embodiments. Electronic key 120 may be implemented as a programmable, processor-based key device. As such, electronic key 120 includes a key controller 130 having a processing circuit comprising a processor 132 and a memory 134. Key controller 130 can be communicably coupled to other elements of electronic key 120 as desired. Further, key controller 130 can exchange access control information with other devices in access control system 100. For example, key controller 130 can transmit and/or receive information from electronic lock 110 via lock interface 115. While lock interface 115 may comprise electrical contacts (as described above), different communication circuitry can be appropriate, for example near-field communication ("NFC") circuitry, or other wireless communication circuitry configured to establish a standardized wireless communication interface according to Bluetooth, Zigbee, Infrared, Wi-Fi, or other protocols. Key controller 130 can be communicably coupled to lock interface 115 through a wired link, wireless link, or combinations of wired and wireless links.

Key controller 130 may transmit or receive information from other devices of access control system 100 via wireless communications circuit 126. Wireless communications circuit 126 can comprise a short-range wireless transceiver, long-range wireless transceiver, or a combination thereof. While the term transceiver is used for brevity, skilled persons will appreciate that wireless communications circuit 126 may include any appropriate combination of one or more transmitters, receivers, and/or antennas needed to communicate with other access control devices or via network 250. The one or more transmitters, receivers, and/or antennas (or other wireless circuitry) may be arranged as a single wireless transceiver, as depicted in the block diagram, or positioned separately and communicably coupled with key controller 130 and other components as desired. Wireless communications circuit 126 may comprise circuitry implemented as a wireless device or module (including a combination of hardware and software/firmware). Further, multiple and different types of circuitry can be combined, for example to facilitate redundancy, to provide support for a plurality of frequencies, or to improve quality and reliability of the communications in accordance with antenna diversity schemes.

In various embodiments, wireless communications circuit 126 may provide WWAN communications, WLAN communications, wireless personal area network ("WPAN") communications, or combinations thereof. Examples of appropriate wireless protocols for establishing WPAN, WLAN, and/or WWAN communications between access control devices (e.g. electronic key 120 and access control server 220), include any one of 802.11x Wi-Fi, Wi-Fi Direct®, Bluetooth®, Zigbee®, NFC, Z-Wave®, infrared, DECT, RUBEE®, cellular protocols such as GSM, UMTS, LTE, 5G, and/or other wireless communication protocols known to skilled persons. Skilled persons will understand that, in various embodiments, lock interface 115 and wireless communications circuit 126 can be implemented together in a single or integrated component. To illustrate, if lock interface 115 comprises wireless communications circuitry, lock interface 115 and wireless communication circuit 126 can be implemented as an integrated wireless communications module configured for providing wireless communications in accordance with the one or more protocols compatible with lock 110 and other devices in access control system 100.

Communications between electronic key 120 and a second access control device can be implemented over an ad hoc Internet Protocol ("IP") WLAN, for example by employing zero-configuration networking (also known as "ZeroConf") protocols. Alternatively, WLAN communications may be implemented over an IP WLAN by executing a set of instructions to configure the network settings, by manually configuring a DHCP server and DNS server, or by utilizing other known methods to distribute IP addresses, resolve domain names, and otherwise configure network settings. As such, wireless communications circuit 126 may be utilized to implement an IP WLAN to facilitate communications between electronic key 120 and one or more proximate (effective range will depend on the protocol) electronic devices without reliance on peripheral third party communications hardware or infrastructure. Indeed, in this implementation electronic key 120 can exchange information with an electronic device utilizing only wireless communications circuit 126 of the key and compatible communications circuitry of the second electronic device.

It will be appreciated by skilled persons that, in some implementations, communications between a plurality of devices in access control system 100 may be facilitated by network 250. Network 250 can comprise communications hardware separate from and/or in addition to wireless communications circuit 126 of electronic key 120. For example, network 250 may comprise one or more networking devices configured to support WLAN (e.g. utilizing protocols such as 802.11x) or WWAN communications between access control devices, including electronic key 120. A WWAN, for instance, can use various wireless protocols including mobile telecommunication cellular network technologies such as long-term evolution ("LTE"), global system for mobile communications ("GSM"), code division multiple access ("CDMA"), and the like. A WWAN can also be implemented using wireless communication standards based on IEEE 802.16, such as worldwide interoperability for microwave access ("WiMAX"). In further examples, a WWAN can be implemented as a plurality of short-range communication nodes communicably linked to create a mesh network. In yet other implementations, network 250 can comprise low-power, wide-area network ("LPWAN") whereby devices such as electronic key 120, electronic lock 110, and access control server 220 may exchange information across long distances using lower bit rates, for example as interconnected devices using technologies and communication protocols commonly associated with the "Internet of Things." In still further embodiments, network 250 can comprise a series of interconnected networks, including wired and wireless networks, that use a variety of protocols, for example, Hypertext Transfer Protocol ("HTTP"), Transmission Control Protocol/Internet Protocol ("TCP/IP"), Wireless Application Protocol ("WAP"), and the like, to communicate with one another. As such, access control devices may comprise different types of network interfaces as necessary to exchange information across network 250. Other communication networks and protocols known to skilled persons may have utility in various implementations.

Access control system 100 can employ various networking devices to facilitate communication and exchange of information, whether via network 250 or other communications links. Examples of such networking devices include a wireless access point, a router, a gateway, a switch, a bridge, a hub, a repeater, a firewall, a multiplexer, and a modem, to name just a few. It will be further appreciated that such networking devices may be embedded on the various electronic devices associated with access control system 100

(e.g. embedded on smart device 160), or may alternatively be located proximate to or remote from such electronic devices and operably associated thereto utilizing the methods and protocols described herein. In some embodiments, network 250 can comprise or interface with existing wireless infrastructure, for example conventional cellular networks managed by commercial mobile network operators (e.g. WWANs utilizing protocols conforming to the 3rd Generation Partnership Project "3GPP" specifications such as LTE).

Networking devices and other access control devices can be connected to the Internet via an Internet service provider ("ISP") according to known methods. In some aspects, and as illustrated generally in FIG. 1, network 250 comprises an Internet connection and the various networking devices, such as cellular antenna 254 and WLAN router 258, can facilitate an exchange of information with available Internet-connected devices, including access control devices in access control system 100, external or third-party devices, web services, and the like. A plurality of different types of networking devices (e.g. cellular antenna 254, WLAN router 258) can provide communication links facilitated by network 250. For instance, wireless communications circuit 126 may interface with an accessible networking device, such as a wireless access point, to exchange information with a remote device via network 250, such as access control server 220. To illustrate further, and with reference to FIG. 1, wireless communications circuit 126 (not shown in FIG. 1) may establish communications with one of Wi-Fi WLAN 260 (facilitated in part by WLAN router 258) or cellular LTE WWAN 256 (facilitated in part by cellular antenna 254) and thereafter exchange access control information with access control server 220. Skilled persons will appreciate that many different networks and network configurations are possible and that this illustrative example does not limit the exchange of access control information to any particular set of networking hardware or communication protocols. Unless specified otherwise, devices in access control system 100 may communicate information via wired links (e.g. Ethernet cable), wireless links (802.11x or LTE compatible circuitry), or combinations thereof. It will be further appreciated that communications between access control devices may optionally be encrypted according to known methods to provide enhanced security.

Turning back to FIG. 3, processor 132 (of key controller 130) may include any suitable processing device for performing logic operations on one or more inputs and other data. For example, processor 132 may comprise one or more integrated circuits ("IC"), microchips, microprocessors, controllers, microcontrollers, general purpose processors, special purpose processors, all or part of a central processing unit ("CPU"), graphics processing unit ("GPU"), digital signal processor ("DSP"), or combinations thereof. Skilled persons will appreciate that processor 132 can comprise any appropriate processing circuit for executing one or more machine instructions (e.g. computer code or programs) or performing logic operations by operating on input data and generating output. For instance, the processes, operations, and/or logic flows described herein may also be performed by special purpose logic circuitry, such as a field programmable gate array ("FPGA") or an application specific integrated circuit ("ASIC"), any other type of IC, a state machine, a group of processing devices, or other suitable electronic processing components or circuitry. Although electronic key 120 is depicted in FIG. 3 as including a single processing device, processor 132, it will be appreciated that key 120 may comprise more than one processing device and that such processing devices can be configured to operate independently or collaboratively. Skilled persons will understand that the processing circuitry examples identified here are non-limiting and illustrative in nature.

The instructions executed by processor 132 may, for example, be pre-loaded into a memory integrated with or embedded into the processing device or may be stored in a separate memory, such as memory 134. Processor 132 may receive instructions and other input data from memory 134, and write data to memory 134 as necessary. While memory 134 is depicted as separate from processor 134, it will be understood that memory may be implemented as a plurality of memory sites, one or more of which may be integrated with circuitry of processor 132 or communicably coupled thereto via wired or wireless links. Skilled persons will appreciate that memory 134 (e.g. memory, memory unit, storage device, etc.) can be any type of computer or machine-readable storage medium capable of storing instructions and/or other data in a form accessible by processor 132. Memory 134 can be implemented as a read only memory ("ROM"), a random access memory ("RAM"), an erasable programmable read only memory ("EPROM"), flash memory, removable media, or any other desired storage medium or combinations thereof. Further, memory 134 may include database components, object code components, script components, or any other type of information structure for supporting the various operations and features described herein.

Memory 134 includes credential data 136 and audit trail database 138, according to various embodiments. Credential data 136 comprises authentication data including at least one access credential (e.g. password, ID code, hardware or device identifier, digital certificate, and/or biometric attribute) associated with at least one electronic lock. Credential data 136 may include any authentication information suitable to authenticate electronic key 120 and/or a user 150 of the key. As described above, electronic lock 110 can be configured to initiate an unlocking event based on the presentation of valid credential data 136 by a device such as electronic key 120. Similarly, electronic lock 110 can deny access to electronic key 120 (i.e. forego initiating an unlocking event) based on invalid credential data 136. Skilled persons will appreciate that credential data 136 can comprise any data in a form accessible by one or more processors of electronic lock 110; authentication of credential data could conceivably comprise the verification of a single bit. In other embodiments, authentication of credential data may comprise processing thousands of biometric data points.

Audit trail database 138 includes information relating to access control events, including details of previous access control events initiated by or otherwise involving electronic key 120. Details of access control events may include a timestamp, device ID, user identifier, result of the event, and other information types that can be recorded and processed for various purposes. Access control events associated with other devices in the system may also be maintained in audit trail database 138, including events not involving the electronic key 120. For example, electronic key 120 can be configured to download or receive all access control events stored in memory sites of another access control device, such as electronic lock 110 or smart device 160. Electronic key 120 can be configured to store audit trail data from other devices in memory 134. In this manner, redundancy may be introduced to access control system 100 (i.e. distributing similar or identical copies of access control information across two or more devices). In some instances, electronic key 120 can receive access control information related to access control events from a remote device (e.g. access control server 220) via network 250 or directly via wireless communication circuit 126. It will be appreciated that use of the term database in connection with audit trail database 138 is for convenience and is not intended to limit the audit trail to any particular data structure or storage configuration. While audit trail database can comprise information stored in a structured query language ("SQL") database or the like, audit trail database 138 may comprise information stored in any data storage format accessible to key controller 130 and/or other devices such as access control server 220.

In accordance with some embodiments, electronic key 120 further includes an access validation engine 300. Access validation engine ("AVE") 300 may comprise a software program, software code, or other instructions executable by processor 132. Thus, one or more memory sites may be communicably linked to processor 132 and provide computer code or instructions to the processor for executing one or more of the processes or features described with respect to AVE 300. As such, AVE 300 comprises machine instructions that, when executed by processor 132, cause the processor to perform one or more of the operations described herein with respect to AVE 300. A software program (also known as a program, software, software application, script, or code) comprising the instructions can be stored in memory 134 (communicably coupled to or integrated with processor 132) and may include code written in accordance with any suitable computer programming language including compiled or interpretive languages, declarative or procedural languages. Examples of programming languages include, but are not limited to, C, C++, C#, HTML, XML, Python, Java, Javascript, Perl, and the like. The program may be deployed in any form accessible to processor 132, including as a stand-alone program, or as a module, component, subroutine, object or other form suitable for use with processor 132 and/or other components of electronic key 120. Embodiments described as being implemented in software, in whole or in part, should not be limited thereto, but include various embodiments implemented in hardware, or combinations of software, firmware, and hardware. For example, AVE 300 may include hardware components such as embedded controllers, FPGAs, ASICs, or other such elements that may be preconfigured for performing one or more operations of AVE 300.

With reference to the illustrative embodiment of FIG. 3, AVE 300 is implemented in software stored in memory 134 and accessible by processor 132 for execution of the instructions that embody the one or more features of AVE 300. AVE 300 is shown as comprising a plurality of software elements for processing various types of access control information and/or access control events, including event request processor ("ERP") 310, access schedule processor ("ASP") 320, and qualification processor ("QP") 330. It will be apparent to skilled persons that these software elements, described and depicted as separate elements to aid in understanding this disclosure, may be implemented as a single software program or application. In other embodiments, customized hardware may execute certain elements and/or particular elements may be implemented in hardware, software, or both.

Memory 134 may comprise other instructions that facilitate the operations of key controller 130 as described herein. As with AVE 300, operations of key controller 130 can be implemented in software, hardware, or combinations thereof. In various embodiments, key controller 130 may receive signals, commands, or data from other elements or circuits of electronic key 120 that are communicably coupled to key controller 130, such as lock interface 115 or wireless communication circuit 126. For instance, key controller 130 can be configured to monitor signals received from lock interface 115 to determine if such signals are indicative of communication or the transfer of data between electronic key 120 and an electronic lock 110. In various implementations, establishing communications between lock 110 and key 120 may initiate an unlocking event at electronic lock 110. For instance, upon establishing a communication link (wired, contact, wireless, etc.) between lock and key, electronic key 120 and electronic lock 110 can exchange credential data 136 (e.g. password or device ID). If the credential data is valid, electronic lock 110 can execute operations to facilitate an unlocking event, for example by displacing a locking mechanism or by changing the state of an electronic switch.

It will be apparent to skilled persons in the art that operations performed in connection with an unlocking event may vary greatly from embodiment to embodiment. To illustrate just one example, key controller 130 may monitor (i.e. receive and process signals) lock interface 115. If key controller 130 receives a signal indicating that communication has been initiated with electronic lock 110, an instruction may be sent to ERP 310 to process the access control event. ERP 310 may be configured to process and handle received (i.e. requested) access control events, for instance to identify the appropriate resources required to generate a response. In basic implementations, ERP 310 can process an access control event by simply generating an unlocking signal based on an access credential. In other implementations, ERP 310 may query one or both of ASP 320 and QP 330 in connection with handling an access control event.

Initiation of a communication link between lock and key may be referred to in this disclosure as an "engagement event." As described above, with reference to FIG. 2, communication can be established between lock and key by way of electrical contacts 112 and electrical contacts 122 (e.g. during mechanical coupling of key and lock). In other embodiments, presenting electronic key 120 within a predefined proximity of electronic lock 110 may initiate establishment of wireless communications (e.g. Bluetooth pairing). Skilled persons will appreciate that communication can be initiated between lock and key according to various other paradigms depending on the particular configuration of communication circuitry.

In certain embodiments, ERP 310 may generate a response to an engagement event comprising transmitting credential data 136 to electronic key 120. Credential data 136 can be conveyed to electronic lock 110 to initiate an unlocking event (i.e. to gain access to the restricted resource) or to initiate other access control events, such as a configuration event for modifying lock settings, or a download event for receiving a copy of access event records from the lock. It will be apparent to skilled persons in the art that the exchange of credential data may comprise transmission of credential data 136 from key to lock, transmission of data from lock to key, or a combination thereof. For example, electronic lock and key may perform a handshake, or other operations to authenticate communicably coupled devices, prior to exchanging credential data 136. In this manner, electronic lock 110 and electronic key 120 may authenticate data received from one another. For instance, ERP 310 may first determine if electronic lock 110 is a trusted device (e.g. by comparing an identifier received from the lock to a database or list of trusted devices) prior to exchanging credential data 136.

Various other security measures can be implemented with the aim of enhancing the security related to lock interface 115 and key-to-lock communications generally. Electronic key 120 may perform a transformation of credential data 136 before emitting a signal based on the credential data. In other instances, data communicated between lock 110 and key 120 may be encrypted to enhance security and reduce the risk associated with surreptitious interception of the data signals. In alternative embodiments, ERP 310 can respond to an engagement event by simply transmitting credential data 136 (or a signal based on credential data) without further authentication (e.g. handshake) or encryption methods. It will be apparent to skilled persons that additional processes, or various combinations of the processes described herein, can be implemented to facilitate the transmission or exchange of credential data 136, with the appreciation that certain operations may require a trade-off between security and convenience.

Figure 4:
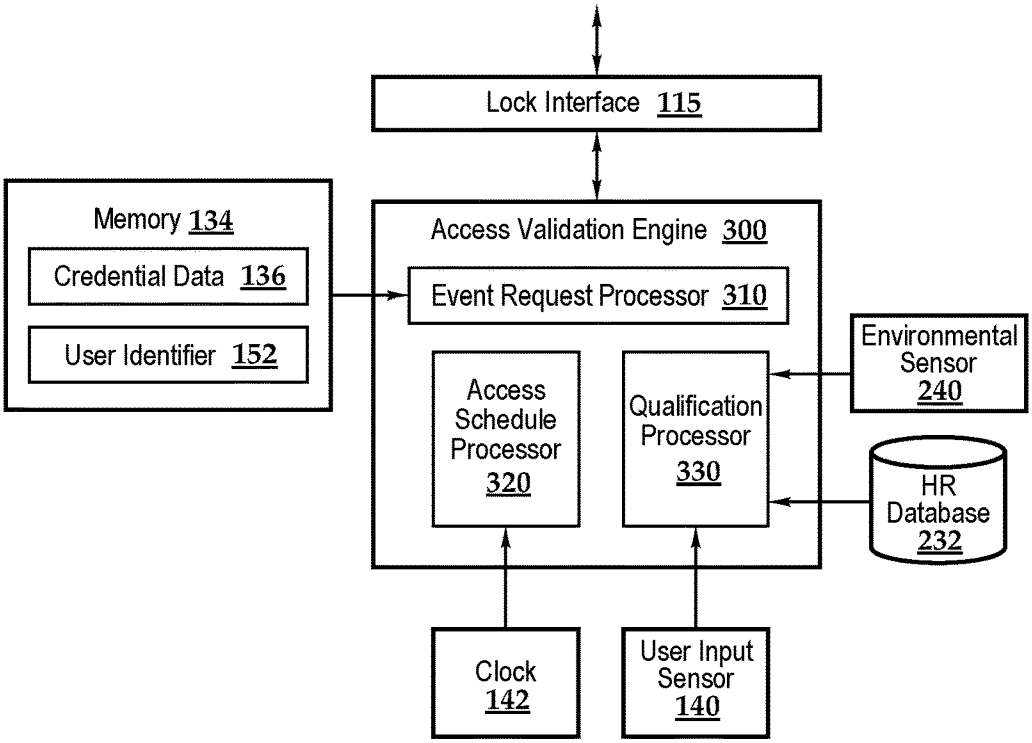
FIG. 4 is a block diagram illustrating an example access validation engine.

ERP 310 may process instructions or information stored in memory 134 when generating a response to an engagement event. ERP 310 can optionally exchange data with other elements of AVE 300. To further illustrate, FIG. 4 depicts a block diagram representing example data flow in connection with processing an engagement event. As described above, the depiction of the various software elements of AVE 300 (e.g. ERP 310, ASP 320, QP 330) as separate in the block diagram is for illustration only. As such, the data flow depicted by FIG. 4 may likewise be executed within a single software program, or any number of software applications desired.

Access to a resource secured by electronic lock 110 may be restricted during certain time periods or on particular dates or days of the week. In other instances, access may be restricted on a seasonal or other temporal basis. In access control systems 100 that comprise a plurality of users, access permissions can be personalized for each user. In other words, each user can be granted access to resources independently of other users in the system. In some instances, users may be grouped together based on various criteria to facilitate batch configuration of access permissions. The term "access permissions" is used herein to denote the specific set of resources that a user is authorized to access. In other words, some users can be granted access to all resources in a system (also known as master access). In other instances, a user may be granted access to a subset of the resources, or even just a single resource. Likewise, the term "scheduled access permissions" denotes the specific set of resources a user is authorized to access, along with corresponding time periods defining when a user may access each of the set of resources. In other words, scheduled access permissions define who can access a resource, and at what time.

In the context of electronic key 120, scheduled access permissions specify the set of electronic locks 110 that the key is authorized to unlock and, for each lock, the corresponding time period that an unlocking event can be initiated. Skilled persons will understand that various different methodologies are suitable for lock 110 and/or key 120 to carry out operations in accordance with the scheduled access permissions. For instance, electronic key 120 may simply forego responding to an engagement event if the event is initiated during a time not authorized by the scheduled access permissions. Alternatively, electronic lock 110 may reject an access credential (e.g. unlocking signal) that is received during a time period not authorized per the scheduled access permissions. In yet a further example, key 120 and/or lock 110 may forego performing one or more operations related to an unlocking event in response to engagement between key 120 and a lock that is not authorized pursuant to the user's access permissions. Accordingly, the elements of key controller 130, namely ERP 310, can perform any suitable operations or methods to selectively grant and restrict access in accordance with a user's scheduled access permissions.

Electronic key 120 can access or store in memory 134, a user identifier 152, for example, to facilitate a personalized key configuration paradigm. User identifier 152 can be associated with access control devices, such as electronic key 120, to correlate access control events with specific users. For example, the user identifier can be recorded and stored in audit trail 138 to identify which of a plurality of users in access control system 100 was responsible for requesting or initiating an event. In this manner, access event records (i.e. audit trail 138) may include user identifier 152 to correlate access events with a user (rather than merely associating events with a device identifier). Likewise, user identifier 152 can be associated with a specific set of access permissions to customize access for each user. To illustrate, ERP 310 may access user identifier 152 in connection with processing engagement events. In embodiments of access control system 100 including a plurality of electronic locks 110, a user 150 can be granted access to certain locks and not to others (i.e. access authorized for a subset of resources in the system). Electronic key 120 and/or electronic lock 110 can be configured in accordance with various authentication schemes to restrict access in such a manner. For instance, electronic key 120 can reference user identifier 152 to determine whether or not a user is authorized to access the specific lock associated with the engagement event. If a user is not authorized to access a particular electronic lock, ERP 310 may decline to generate a response to an engagement event, deliver invalid credentials, or otherwise perform operations that do not cause electronic lock 110 to initiate an unlocking event. Skilled persons will appreciate that limiting access to a subset of a plurality of electronic locks 110 can be implemented in various other schemes. In accordance with a scheduled access scheme, a user 150 may be assigned valid time windows only for a subset of electronic locks. It will be apparent to skilled persons that different methodologies may restrict a user's access to certain locks (and by extension, resources) in accordance with scheduled access permissions.

The user identifier may be any information suitable for identifying a particular user of access control system 100, including a user ID number, name, or other value. User identifier 152 can be provided to electronic key 120 through the communication methods described herein. To illustrate, if an administrator knows which particular key each user is carrying, the administrator can manually assign keys to users, for instance via access control terminal 210, and the appropriate user identifier 152 can be transmitted to each key 120 (e.g. by way of access control server 220 and network 250). Electronic key 120 can adjust access permissions (e.g. stored in memory 134) in response to the user identifier 152, or alternatively, access control server 220 can transmit customized access permissions to key 120 based on the user identifier 152. In other implementations, key 120 may maintain a plurality of different access permissions (e.g. associated with multiple users) in memory 134 and ERP 310 can reference the specific permissions associated with user identifier 152. Other methodologies for personalizing user access permissions are possible.

A user identifier 152 may be provided by or captured from the user prior to initiating an engagement event, periodically, or upon request from an administrator or access control device. To illustrate, a user input sensor 140 can be configured to capture user data, such as a personal identification number ("PIN") or biometric attribute. User input sensor 140 can be implemented in any combination of hardware and software for capturing input or characteristics associated with the key carrier and may include a fingerprint scanner, keypad or touchscreen, camera, retina imager, and the like. Data captured at user input sensor 140 can be stored in memory 134 for reference during processing of an engagement event or other access control event. If the key is handled by a different user, a new user identifier 152 can be captured and access permissions or engagement event responses adjusted accordingly (e.g. adjusted by key controller 130/AVE 300 or requested from access control server 220), if necessary.

A user identifier 152 can be provided to electronic key 120 via other access control devices, for instance during a key checkout process or other procedure for issuing keys to users. In embodiments of access control system 100 having shared keys (i.e. two or more users sharing a single electronic key 120), user identifier 152 can facilitate a process of periodically assigning a key to a specific user. In other implementations, each user in access control system 100 may be issued his or her own key and the user identifier can be stored indefinitely (e.g. until the user is removed from the system). A particular user 150 may "check out" or retrieve the key from another access control device, such as a programming device, docking station, or secured enclosure. User 150 may provide identifying information (e.g. PIN, password, biometric characteristic) in connection with the check-out process. The programming device can thus provide electronic key 120 (via communication methods described herein) with an instruction including the user identifier 152 that was entered or captured during the check out procedure.

User identifier 152 can be made available to ERP 310, for example by storing a variable in memory 134 in a form accessible by ERP 310, or via an instruction generated by QP 330. ERP 310 may generate a response to an engagement event based, at least in part, on user identifier 152, for example by initiating an unlocking event if the user identifier 152 is associated with scheduled access permissions that authorize the requested unlocking event. Upon return to the programming station or check out device, user identifier 152 can be deleted from the key (or otherwise rendered obsolete) such that the key is ready to be checked out by a new user. Accordingly, electronic key 120 can be configured to enforce personalized scheduled access permissions (e.g. schedule, access to certain locks) associated with a particular user. To illustrate, user 150 may be granted access to a certain resource, such as an employee entrance, only between the hours of 8:00 am to 5:00 pm. An electronic key 120 issued to that user (e.g. in connection with a check-out process) can be configured such that the key is programmed with scheduled access permissions representing the user's access to the resource. As such, attempts by the user to initiate an unlocking event with the key outside of the 8:00-5:00 window may be disallowed by one or both of lock 110 and key 120.

It will be apparent to skilled persons that scheduled access can be implemented with respect to various devices. An access schedule can be assigned to electronic key 120, electronic lock 110, and/or user 150, or combinations thereof. In other words, where electronic key 120 is permitted to access a resource from 10:00 am to 10:30 am, any user carrying that particular key may only be granted access in the specified 30-minute window. Whereas a schedule assigned to a particular user 150 may not impact access by other users, even where electronic key 120 is shared among a plurality of users. In this respect, ERP 310 may reference user identifier 152 when processing a response to an engagement event, or when adjusting scheduled access permissions (e.g. in response to capturing user identifier 152 via user input sensor 140).

Although scheduled access permissions (i.e. specific locks, demarcated time periods) can be considered an integrated concept (and may be enforced via a single software element), to aid in understanding the features and operations of AVE 300, processing of schedule data and temporal operations may be described with respect to ASP 320. For instance, ERP 310 can exchange information with or receive instructions from ASP 320. ASP 320 may deliver schedule data to ERP 310 including an instruction that access to the communicably coupled electronic lock 110 is not authorized at the specific time of the engagement event. ERP 310 may, for example, provide ASP 320 with a user identifier 152 and ASP 320 can respond by returning schedule data associated with the current user of key 120. In other implementations, ASP 320 may provide a Boolean result (e.g. true or false) representing whether or not the user is authorized for access at the present time. In various implementations, electronic key 120 may include a clock 142 for facilitating scheduled access processes. ASP 320 may be communicably coupled to clock 142 and data generated by the clock can be accessed or received by ASP 320 in connection with providing schedule data or otherwise generating a response to ERP 310. Skilled persons will understand that operations can be distributed across one or more of ERP 310, ASP 320, and QP 330 as desired. In other embodiments, electronic lock 110 can include a clock or other timing device and provide time or date information to electronic key 120 during an engagement event. In yet further alternatives, electronic key 120 can receive time or date information from other access control devices, such as smart device 160, or access an Internet time service via a networking device associated with network 250.

As described above, various methodologies may be employed by the access control devices to enforce scheduled access permissions. For instance, ERP 310 may forego an attempt to initiate an unlocking event (i.e. decline to transmit credential data 136) based on instructions generated by or received from from ASP 320. In other implementations, time/date information may be included with or used to transform credential data 136 prior to delivering a signal to electronic lock 110. To illustrate, where initiation of an unlocking event occurs during an unauthorized time period, the time/date information may be used to transform credential data 136 in a manner rendering it invalid, such that electronic lock 110 will decline to perform the unlocking event. It will be appreciated by skilled persons that other methods and processes are available for restricting access in accordance with a temporal schedule.

In accordance with some embodiments, access to resources can be subject to satisfying or meeting conditions based on information or criteria that is separate from defined access permissions. In other words, the information can be processed and evaluated (e.g. against criteria) independently of or in addition to scheduled access permissions that govern who can access resources, and when. If the information meets certain defined criteria, the condition is satisfied and access may be granted. Access to resources can be controlled by scheduled access permissions based on the identity of the user (i.e. who receives access to which resources) and an access schedule (i.e. when the user can access the resources), as described above. However, additional access conditions can be applied to more precisely administer resources of an access control system, to implement user or resource safeguards, or for other purposes. For example, a user may be required to achieve a certain rank or level, such as a military rank or employment position, in order to access certain resources. Access rules may also be subject to access conditions relating to the resource itself. For instance, a resource may be unavailable for repairs following a malfunction or failure. With respect to static (or stagnant) access conditions that are unlikely to change over time (i.e. satisfied to failed, or vice versa), such conditional rules may effectively be integrated with the scheduled access paradigm described above. In other words, a system administrator may manually revoke access permissions to a decommissioned resource that is no longer available to users. Likewise, a system administrator may manually modify scheduled access permissions in response to an employee promotion or other change in user status. With respect to static conditions, the manual configuration of access rules may consume minimal time and/or present minimal risk to users and resources.

However, in at least some implementations, permissions governing users access to resources may be subject to satisfying one or more access conditions based on or comprising dynamic information or criteria. In contrast with static or stagnant conditions, dynamic conditions may be subject to frequent or unpredictable change (e.g. from satisfied to failed) and such change may impact a user's access to a resource. Like static conditions, dynamic conditions can be evaluated based on criteria relating to a resource, including for example an operational status of complex machinery, environmental conditions such as the presence of a hazardous substance, or a lockdown mode triggered by tampering or the like. Dynamic conditions may also be based on criteria relating to a user. For instance, a user may need to complete frequent or periodic tasks, such as training or maintenance, in order to access a particular resource. In other examples, a user may be required to make timely payments to receive access, akin to a subscription model. In conventional systems, it can be impractical to integrate evaluation of dynamic conditions into access paradigms, for example to adjust access to resources based on changes associated with users or the resources themselves. In such conventional systems, a system administrator tasked with manually adjusting access rules may need to perform time-intensive monitoring of user qualifications, for example by acquiring and reviewing training reports or maintenance logs. If an access condition changes, for instance a user fails to maintain his or her training, the administrator would first need to recognize the change, and then commit to manually revoking the access permissions, for example by removing the user's access to locks associated with certain resources. Such static access control paradigms are unreliable and susceptible to errors that reduce the effectiveness of safety measures based on the additional conditions or criteria. For instance, in previous systems, access may inadvertently be granted to a user that failed to maintain required training, thereby exposing users and/or resources to increased risk of injury or damage.

In various aspects of this disclosure, additional access conditions can be evaluated periodically (e.g. hourly, daily, weekly), in response to an access control event (i.e. in real time during processing an engagement event), or upon request by an administrator or user. In some implementations, conditions or criteria can be associated with an expiration time and evaluation can correspond to the expiration. For example, a training certificate may only be valid for 12 months and the training data can be evaluated each year on the anniversary of the certification to determine if the training condition is satisfied (i.e. user's most recent training meets the 12-month criteria). AVE 300 can be configured to evaluate additional criteria in connection with generating a response to an engagement event. As described above, AVE 300 may process user identifier 152 and associated scheduled access permissions to determine that the particular user of electronic key 120 is indeed authorized to access the communicably coupled lock 110 at the time of the access attempt (i.e. time of engagement). However, in addition to evaluating whether the user of the key is authorized to access the resource according to the scheduled access permissions, AVE 300 can also evaluate one or more additional conditions to ultimately determine whether to initiate an unlocking event. In this manner, AVE 300 can facilitate a more dynamic access control system that is responsive to user activity and/or variable resources. By increasing the frequency of the condition analysis, AVE 300 can approach real-time responsiveness to changes impacting the safety or security of access control system 100.

An environmental condition is just one example of a dynamic condition that will be described to further illustrate the types of supplemental information that can be processed with respect to engagement events, according to some embodiments. A resource may include hazardous substances like a flammable vapor or liquid, for instance. In this example, it may be dangerous to access the resource if the flammable substance exceeds a certain concentration. Depending on the nature of the resource, concentration of the hazardous substance may be unpredictable, such as in the event of a component failure or gas leak, or where the concentration varies based on weather or other environmental factors. In previous systems, it could be impractical to control access based on unpredictable or rapidly changing environmental factors, for instance where a resource is in a remote location. Alternatively, an administrator tasked with manually monitoring environmental risks in prior systems may mean the safety of users is susceptible to human error. In aspects of this disclosure, however, electronic key 120 (and other access control devices) can dynamically adjust access to resources in response to changes in environmental conditions. In this manner, safety of users can be improved by rapidly adjusting access to resources during dangerous periods.

Referring still to the example environmental condition (i.e. resource with the hazardous substance), a particular user of electronic key 120 may be granted access to the hazardous resource. The user may be a maintenance technician having scheduled access permissions providing full access (24 hours per day, 7 days a week), for example to facilitate repairs, cleaning, or other purposes. As described above, electronic lock 110 and electronic key 120 may exchange credential data 136 to permit the user access to the resource. The user, having 24-hour access, may unknowingly attempt to access the resource during a period when the resource (or nearby area) presents a hazard or danger (e.g. due to a gas leak). Such access could result in harm to the user and/or damage to the resource. However, in accordance with various embodiments, AVE 300 may process and analyze criteria or other data relating to the resource prior to initiating an unlocking event at the proximate electronic lock 110. For example, AVE 300 may process data related to environmental conditions. Environmental parameters may be monitored by sensors associated with the resource and the related environmental data made available to electronic key 120, for instance via wireless communication circuit 126.

In response to an engagement event including electronic key 120 and the particular electronic lock 110 restricting access to the hazardous resource, AVE 300 may, in accordance with the scheduled access rules, first evaluate if user 150 is authorized to access the resource at the present time in accordance with the applicable scheduled access permissions. Thereafter, AVE 300 may additionally process and evaluate environmental data to determine if the resource is in a safe state. If analysis of the environmental data indicates that access to the resource is hazardous, AVE 300 may determine that the condition is not satisfied and decline to initiate an unlocking event, even if the user of key 120 is otherwise authorized pursuant to the access permissions. In this manner, evaluation of a dynamic condition may be independent of or even override scheduled access permissions. In some implementations, AVE 300 may alert user 150 of the unsafe environment, for instance via an alarm 128 (shown in FIG. 3). Alarm 128 can be implemented in hardware, software, or a combination thereof. Alarm 128 can comprise an LED or other visual indicator, an audio indicator such as a piezo buzzer, or a vibration device (e.g. off-balance motor). Electronic key 120 may comprise other or additional hardware and/or software elements to alert the user via visual, audible, or haptic feedback.

Conditions or criteria relating to users can also undergo frequent and unexpected change. Moreover, access to certain types of resources may be based on a user's qualifications or skills. These qualifications and skills may change over time, thereby impacting a user's access to the resources. For example, access control system 100 may comprise a plurality of electronic locks, in accordance with some embodiments. Access control system 100 may comprise different types of resources secured by the plurality of electronic locks. Resources can be differentiated by way of any suitable attributes or properties, such as risk factors, value, strategic importance, size, location, susceptibility to tampering or misuse, and other distinguishing attributes or properties. As such, it may be desired to implement enhanced security measures for a particular resource or set of resources. In some implementations, it is desired to restrict access to certain resources based, at least in part, on proficiencies or qualifications of the user 150. For example, certain resources that are deemed particularly valuable may only be accessed by users that have demonstrated a certain level of trust or accountability. In other cases, a resource that presents a substantial risk of bodily harm may only be accessed by users that have completed training intended to mitigate the risk or danger. In yet other examples, a resource comprising complex machinery may only be accessed by users that have attended or passed instructional courses for operating the machinery. In other implementations, the criteria may change, for example additional training requirements may be defined based on installation of new machinery or upgrades to existing resources. Relying on a system administrator to monitor the user qualifications and adjust access permissions accordingly is error-prone and unreliable. As a result, unqualified users may mistakenly be granted access to resources.

Figure 5:
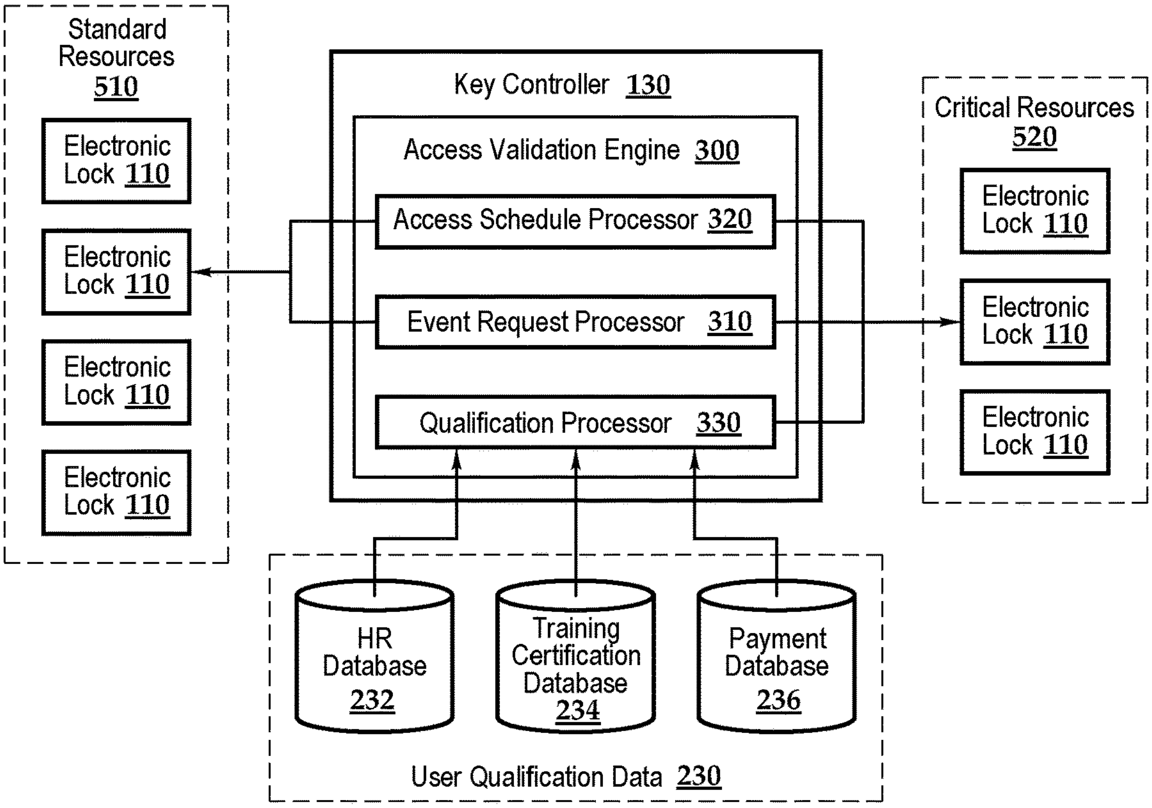
FIG. 5 is a block diagram illustrating an example key controller of an electronic key and further illustrating example communication interfaces between the electronic key and electronic locks and example communication interfaces between the electronic key and database resources.

Turning to FIG. 5 to further illustrate certain embodiments, an example access control system 100 comprises different types of resources (distinguished by any suitable properties) including standard resources 510 and critical resources 520. Access to standard resources 510 is controlled by a plurality of electronic locks 110. Likewise, access to critical resources 520 is also secured by a plurality of electronic locks 110. Critical resources 520 may include, for example, resources that are of greater importance, such as expensive or sensitive equipment, sensitive documents or electronic records (e.g. social security numbers, credit card data), executive offices or suites (e.g. used by managers or directors), or valuable items (e.g. jewelry, diamonds). In other embodiments, critical resources 520 may comprise resources that present a danger or risk to users of access control system 100. In yet other examples, critical resources 520 may comprise complex machinery that necessitates instructive training to ensure safe operation.

In various aspects of this disclosure, access to resources can be subject to, at least in part, qualifications or aptitude of user 150. In some implementations, user qualifications can qualify a user for access to a particular resource. Likewise, user qualifications (or lack thereof) may be used to disqualify a user from access to a resource. User qualifications can be defined separately from, or supplemental to, scheduled access permissions. In other words, while user identifier 152 may indicate who is accessing a resource, a user qualification indicates whether a particular user has met certain criteria. User qualifications can vary and may depend in some instances on the nature of the resources. For instance, a user qualification may define an aspect of a user's abilities or skills. Or a user qualification may be based on criteria including completion of or attendance at a training program.

AVE 300 can be configured to receive and process user qualification data generated by or received from other access control devices. User qualification data can be any type of information suitable for distinguishing users on a basis other than identity. User qualification data can be generated by or maintained in one or more databases related to users of access control system 100. In some implementations, databases comprising user qualification data can be associated with facility operations that are peripheral to access control system 100, such as human resources, accounts receivable, and the like. Skilled persons will appreciate that elements of access control system 100 may be integrated with additional systems for various purposes, for example for convenience purposes by providing a simplified graphical user interface or for security purposes to provide enhanced security to peripheral systems. One or more databases comprising information related to user qualifications can be stored on access control devices, such as access control server 220, smart device 160, or even electronic key 120. In other implementations, such databases may be stored in memory sites of other systems and made available to access control system 100 via known communication paradigms, such as those described with respect to access control devices. Further yet, a database including user qualification data can be stored remotely, for example in the cloud, and made available to access control devices (e.g. access control server 220 or electronic key 120) via an Internet connection facilitated by network 250. Skilled persons will appreciate that user qualification data can be stored in memory sites of any suitable device and in any suitable form accessible by AVE 300.

If user qualification data is maintained in memory sites separate from electronic key 120, the user qualification data can be made available to key controller 130 via the communication methods and circuitry described herein, such as wireless communication circuit 126. QP 330 can be configured to process user qualification data accessible by AVE 300. Key controller 130 can generate responses to engagement events based, at least in part, on user qualification data. In various implementations, key controller 130 may generate responses to engagement events based on scheduled access permissions and user qualification data. Key controller 130 may decline to initiate an unlocking event if it determines user qualifications are invalid, even if scheduled access permissions authorize access to the lock at the time of the access attempt.

Scheduled access to a particular resource can be granted to a group of employees. For example, maintenance staff may be granted access to facility HVAC system components during normal operating hours (e.g. 6:00 am to 10:00 pm). In addition, the maintenance staff may be required to maintain relevant training associated with the HVAC system. In the example described here, scheduled access permissions can be configured based, at least in part, on an identity of the user (i.e. a specific user can be assigned access to HVAC resources as member of the maintenance staff) and a temporal schedule (i.e. access granted between 6:00 am and 10:00 pm). In addition, a valid user qualification (i.e. user completed necessary training) is required to access the HVAC resources. In this example, access to HVAC resources may only be granted to user 150 if scheduled access permissions and the user qualification each, separately authorize access. If a user fails to attend or complete the requisite training program, the user may be prohibited from accessing the resource, even though the user may still be assigned access pursuant to scheduled access permissions associated with the maintenance staff. As described above, various methodologies are suitable for enforcing the various rules. For example, failure of the qualification condition (i.e. failure to maintain the proper training) may be processed by AVE 300 in a manner that effectively removes the user from the maintenance staff group. It will be apparent to skilled persons that different logic rules and methodologies are suitable for carrying out these operations.

Referring still to FIG. 5, key controller 130 may process responses to engagement events for members of the maintenance staff, according to embodiments of this example access control system. Maintenance staff may have access to standard resources 510, such as janitorial supply closets, building entrances, and equipment sheds. Maintenance staff may also be assigned or granted access to critical resources 520, including the HVAC system resources. Maintenance staff can be assigned scheduled access permissions to facilitate use of electronic key 120 to initiate unlocking events at a plurality of electronic locks 110 for access to the various standard resources 510 and critical resources 520. Scheduled access permissions can be defined granting access to all electronic locks 110 during business hours (e.g. weekdays from 6:00 am to 10:00 pm). However, access to HVAC system resources may require user qualifications including a valid (i.e. current) training certificate. Training may be required periodically, for example every 6 months. User qualification data 230 may comprise various databases comprising information relating to users of access control system 100, including HR database 232, training certificate ("TC") database 234, and a payment database 236. Skilled persons will appreciate that other types of user related data can be maintained.

User qualification data 230 can be made available to electronic key 120 via wireless communication circuit 126. For instance, the various databases can be implemented as an element of access control server 220 and communicably linked to electronic key 120 via network 250. Or the databases can be distributed across a plurality of hardware and electronic storage devices and each connected to the Internet. Electronic key 120 can thereafter access information from user qualification data 230 by way of any communication link supporting Internet communications. For example, electronic key 120 can connect to Wi-Fi WLAN 260 (see FIG. 1) via wireless access point 258 to establish an Internet connection. Alternatively, wireless communication circuit 126 can be configured to provide WWAN communications in accordance with standard cellular networks and may access user qualification data 230 by way of cellular LTE WWAN 256. In yet further implementations, it may be impractical to configure electronic key 120 with WWAN circuitry and, as such, wireless communication circuit 126 can be communicably coupled with a short-range radio (e.g. Bluetooth) of smart device 160. Smart device 160 may also be connected to the Internet via cellular LTE WWAN 256 and electronic key 120 can access user qualification data 230 that is received at smart device 160 (via LTE WWAN 256) and thereafter made available to key controller 130 via the short-range wireless communications. Other communication paradigms are possible and the examples described herein are non-limiting and intended to be illustrative in nature.

The example maintenance staff described above includes a user 150 that may employ electronic key 120 to cause an unlocking event at each of the plurality of locks 110 for accessing standard resources 510 and critical resources 520. Key controller 130 can respond to engagement events at electronic locks associated with standard resources 510 by preparing a response consistent with the user's scheduled access permissions. With respect to standard resources 510, AVE 300 may respond to an engagement event involving electronic lock 110 by performing operations including verifying that the key is issued to (e.g. checked out, as described above) an authorized user, here a member of the maintenance staff. To illustrate, ERP 310 can verify the identity of the user by, for example, accessing a variable representing user identifier 152 that is written to memory 134 during a check-out procedure. In other implementations, ERP 310 can query QP 330 for user data, such as a biometric characteristic or PIN captured at user input sensor 140. ERP 310 may further query or exchange data with ASP 320 to confirm that the engagement event was initiated at a time period during which the user 150 is authorized to access the resource, according to the scheduled access permissions. ERP 310 may provide one or both of user data (e.g. user identifier 152) and lock data (e.g. lock device ID) to ASP 320. In response, ASP 320 can provide schedule data or an instruction (e.g. Boolean response) indicating whether the identified user is authorized to access the engaged lock at the time of the access attempt. ASP 320 may receive time data from clock 142 to facilitate schedule processing. In this implementation, if user 150 attempts to access standard resources 510 at 8:30 am, key controller 130 can deliver credential data 136 (or a signal based thereon) to electronic lock 110 to initiate an unlocking event. Likewise, if the user attempts to access electronic lock 110 at 11:30 pm, one or both of lock 110 and key 120 may forego performing the operations necessary to cause the unlocking event. The processes and operations described in connection with this example can be adjusted or modified without departing from the scope of this disclosure. It will be apparent to skilled persons that other processes and operations can be performed by electronic key 120 or electronic lock 110 to facilitate user access in accordance with the scheduled access permissions.

User 150 may also attempt to access HVAC system resources for performing maintenance or repairs. However, in this example, HVAC system resources are assigned as critical resources 520. Based on criteria established by system administrators or security personnel, access to HVAC system resources requires user 150 to maintain up-to-date training. In this example, a dynamic condition can be defined based on user training attendance and access to HVAC system resources may be selectively granted based, in part, on the dynamic condition. As such, key controller 130 may respond to an engagement event involving a lock 110 configured to restrict access to critical resources 520 by verifying user identity and access schedule data (i.e. that access is authorized according to scheduled access permissions), for example in a manner similar to that described above with respect to standard resources 510. If a member of the accounting department, for instance, checked out electronic key 120 and attempted to access HVAC system resources, AVE 300 may be configured to forego initiating the unlocking event based on the accounting personnel failing to satisfy the scheduled access permissions. In other words, the accounting personnel may not have been granted any access to HVAC resources. AVE 300 may further actuate an alarm to alert others of the unauthorized access attempt by the unauthorized accounting personnel.

Referring back to the member of the maintenance staff, upon a determination that user 150 is authorized to access the particular electronic lock 110 in accordance with the scheduled access permissions, AVE 300 may be configured to additionally verify that user 150 has completed the required training. QP 330 can access data associated with user training to evaluate whether user 150 has satisfied the training requirement and is thus qualified for access to HVAC system resources. QP 330 can access data maintained as part of TC database 234. For instance, TC database 234 may include records of training courses or programs completed by various users. QP 330 can be configured to access, or receive from TC database 234, training records for user 150. Access to and processing of data associated with a dynamic condition can be implemented in various ways. QP 330 can employ Boolean logic, for example, to process data and determine whether or not a condition is satisfied (e.g. true or false). Other algorithms or logic rules can be implemented to facilitate a process for determining whether a condition permits access or does not permit access.

Various embodiments are described in connection with an element of AVE 300 that can be implemented to access or query a remote database (e.g. TC database 234). The database can be maintained in memory sites of an access control device, an external device communicably coupled to an access control device (e.g. via the Internet or network 250), or distributed across combinations thereof. It will also be apparent to skilled persons that other information storage models can be employed to facilitate processing of dynamic condition data, in accordance with some embodiments. For instance, training data can be pushed to electronic key 120 and stored in memory 134 in any format accessible to AVE 300. Access control server 220 may be configured to monitor TC database 234 and, in response to changes, or upon expiration or a predetermined deadline, automatically transmit (e.g. push) training data or training results to electronic key 120. Key controller 130 can be configured to write a variable related to user training to memory 134 for access by AVE 300. In other embodiments, electronic key 120 may be implemented with the necessary processing circuitry and memory sites to maintain TC database 234 (or copy or portion thereof) at the key itself. Various other data storage and processing paradigms are suitable for verifying data related to a dynamic condition and the example database implementation shown and described with reference to FIG. 5 is but one illustrative example.

If the training records confirm that user 150 last completed the requisite training within the prescribed period (e.g. 6 months), QP 330 can generate a response for ERP 310 indicating that the user satisfied the dynamic (training) condition. Accordingly, based at least on the user 150 having access permissions authorizing access to the lock at the time of the engagement event, and the user having valid training credentials, key controller 130 may initiate an unlocking event at lock 110 (e.g. by generating an unlocking signal based on credential data 136). To illustrate further features, assume that the user returns to the resource the following month. Here, QP 330 determines that user 150 last completed the required training 6 months and 3 days prior to the current access attempt. As a member of the maintenance staff, the user may still have scheduled access permissions, assigned based on the user's inclusion in that group, that authorize access to standard resources 510 and critical resources 520. However, QP 330 may respond to ERP 310 with an instruction indicating that the dynamic condition was not satisfied (i.e. that the user did not maintain the requisite training). Key controller 130 then declines to initiate the unlocking event based on evaluation of the dynamic condition related to user training.

However, in various implementations the result of processing or evaluating the dynamic condition does not impact or adjust the user's scheduled access permissions. Accordingly, user 150, while not possessing the required training credentials for HVAC access, may use electronic key 120 to access other standard resources 510, and any critical resources 520 that are not subject to the training verification condition, such as where critical resources comprise additional resources separate from the HVAC system. As such, evaluation of the dynamic condition (i.e. satisfied or failed) does not adversely impact access to resources that are not subject to the condition. In this manner, efficiency of access control system 100 can be maintained by adjusting access only to the extent necessary to enforce the dynamic condition. Upon user 150 completing the training, AVE 300 may again determine that access to HVAC system resources is permissible and key controller 130 can cause initiation of the unlocking event. It will be appreciated that the selective granting and denying of access to HVAC system resources described above may be facilitated, in part by AVE 300 (specifically QP 330), without any intervention or input by user 150 and/or the user's manager or system administrator.

Conventional systems required a system administrator to manually remove access if a user failed to maintain the requisite qualifications (e.g. training credentials) for a resource. In such conventional systems an administrator may have been required to manually monitor user qualifications, for example by acquiring and reviewing training reports. In the event a user failed to maintain requisite qualifications, the administrator would then be required to manually revoke access permissions, for example by individually removing a user's access to locks associated with certain resources. Such static access control paradigms are susceptible to errors and reduce the effectiveness of user qualification safeguards. For instance, in such static systems, access may inadvertently be granted to a user that failed to maintain required training, thereby exposing users and/or resources to increased risk of injury or damage. Further, manual adjustment of access permissions in response to changing dynamic conditions may inadvertently impede access to other resources, thereby reducing the efficiency of access control system 100 unnecessarily.

In various aspects of this disclosure, user qualification data can be processed periodically (e.g. hourly, daily, weekly) in response to an access control event (i.e. in real time), in relation to a qualification expiration date, or upon request by an administrator or user. In some implementations, user qualification data 230 can be processed and analyzed periodically for one or all users in access control system 100. As such, AVE 300 can facilitate a more dynamic access control system that is responsive to user activity. By increasing the frequency of the analysis, AVE 300 can approach real-time responsiveness to changes associated with user 150.

Dynamic conditions relating to a resource itself, rather than a user, can be evaluated in connection with access to the resource. As shown generally by the block diagram of FIG. 6, an access control system 100 comprising a plurality of electronic locks 110 can further comprise different types of resources. In an example embodiment, the resources include harmless resources 610 and hazardous resources 620. In this particular example, harmless resources 610 may comprise general office space, supply closets, bathrooms, perimeter gates, and the like. Hazardous resources 620 may comprise complex heavy machinery, storage areas designated for volatile or hazardous substances, and equipment for the delivery or distribution of electricity, to describe a few examples. It will be appreciated that hazardous resources 620 comprise substances or equipment that present an increased level of risk to users, when contrasted with harmless resources 610. In some situations, access to hazardous resources 620 may present an unjustifiable risk such that it is desired to prevent user access until the threat is removed or mitigated. In various embodiments, a safeguard can be implemented based on a dynamic condition associated with the resource.

Figure 6:
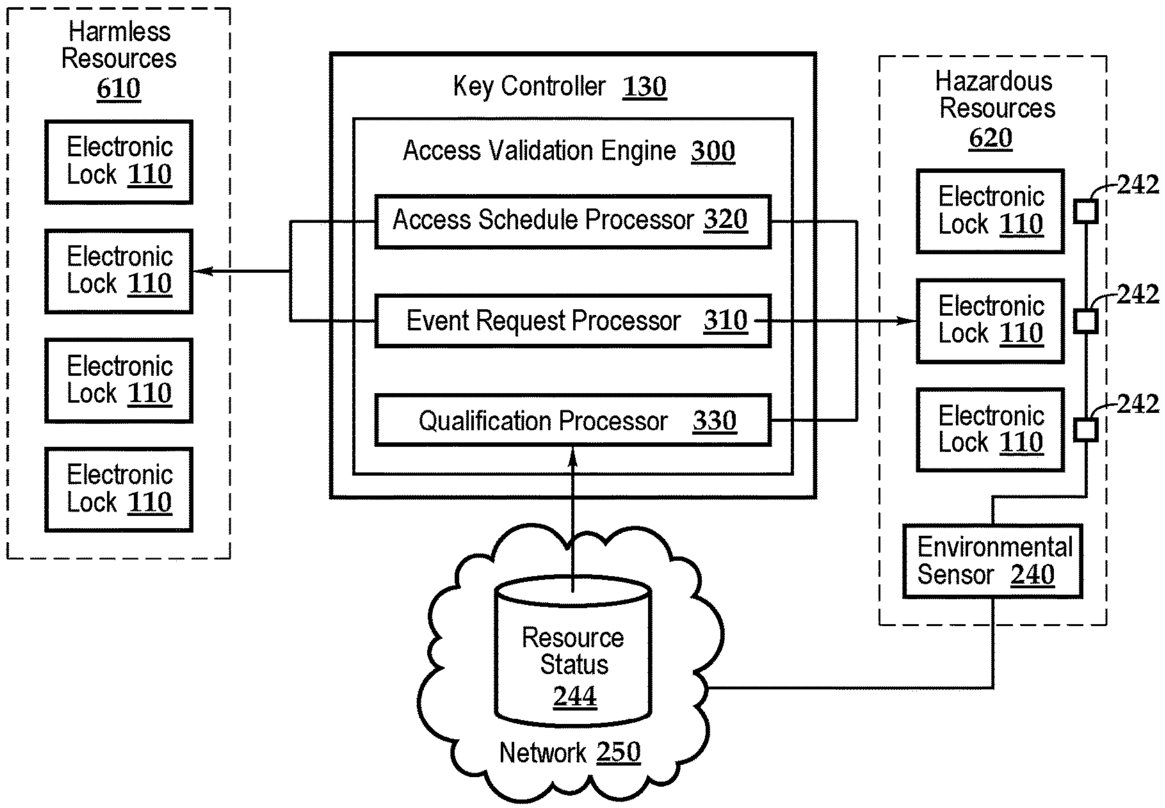
FIG. 6 is a block diagram illustrating an example key controller of an electronic key and further illustrating example communication interfaces between the electronic key and electronic locks and example communication interfaces between the electronic key and an environmental sensor.

An example can be described with reference to FIG. 6 (and FIG. 4). Access to hazardous resources 620 can be restricted by way of one or more electronic locks 110. An environmental sensor 240 can be configured to measure environmental aspects associated with hazardous resources 620. For instance, environmental sensor 240 can be implemented as hardware to measure particulate matter or air quality proximate to hazardous resources 620. Environmental sensor 240 may measure the concentration of a dispersed combustible substance and analyze the data to determine if the mixture is within the flammability or explosive limits for that substance. Alternatively, environmental sensor 240 may be implemented as a simple thermometer. In some implementations, environmental sensor 240 can be a complex system of circuitry designed to capture and analyze a wide range of environmental parameters. For instance, a series of environmental sensor nodes 242 can be communicably interconnected to capture environmental aspects associated with a plurality of resources or areas proximate to such resources. In yet other examples, environmental sensor 240 can be configured to measure operational states or characteristics of a machine or device. For instance, environmental sensor 240 can be implemented as an accelerometer configured to measure acceleration forces associated with a particularly dangerous element of machinery. Other operational characteristics may include, for example, voltage, current draw, power draw, power input, temperature, run time, fuel levels, and the like. In further examples still, environmental sensor 240 may detect unauthorized access to the resource, or tampering of electronic lock 110. Other sensors will be apparent to skilled persons in the art and the aforementioned configurations are illustrative in nature. Environmental sensor 240 can be implemented as any suitable hardware, software, or combination thereof, for detecting or measuring one or more properties related to a resource.

QP 330 can be implemented as an element of AVE 300 and perform operations related to resource data that are analogous to those described with respect to user data. QP 330 may receive and process resource qualification data accessible by AVE 300. In the present example, data captured by environmental sensor 240 can be made available to AVE 300 by way of the data storage and communication paradigms described in this disclosure. For instance, environmental sensor 240 can be communicably linked to network 250, as shown by FIG. 6. The environmental data generated by environmental sensor 240 may also be referred to as resource qualification data. In other words, the environmental data can be used to qualify a resource for access based on one or more environmental characteristics or properties. The environmental data generated by environmental sensor 240 can be sent directly to electronic key 120 or other access control devices associated with access control system 100. Environmental data from sensor 240 may also be maintained in resource status database 244 for access by various access control devices, including electronic key 120. Resource status database 244 can be implemented in any suitable memory sites, and may be an element of access control server 220 for example. Where resource status database 244 is maintained in memory of a device other than electronic key 120, resource qualification data stored therein may be made available to AVE 300 via wireless communication circuit 126 and network 250.

Key controller 130 can be configured to respond to engagement events associated with harmless resources 610 without processing (or otherwise ignoring) the resource qualification data. For instance, key controller 130 may initiate an unlocking event at any lock of harmless resources 610 in accordance with scheduled access permissions (e.g. by verifying user/device ID and time of access attempt). Accordingly, ERP 310, together with ASP 320, can determine if the key is authorized to access the lock (e.g. by verifying the assigned user has access) at the time of engagement (e.g. by verifying the engagement event is within an authorized schedule window). If access is authorized, AVE 300 can generate a response including an instruction for key controller 130 to deliver an unlocking signal based on credential data 136. As described elsewhere, different methods for initiating an unlocking event are possible.

However, upon engagement with an electronic lock 110 that is implemented to restrict access to hazardous resources 620, key controller 130 can be configured to respond to the engagement event by performing operations including processing resource qualification data. In various embodiments, resource qualification data can be processed in addition to verifying scheduled access permissions (e.g. by verifying user/device ID and access attempt time). To illustrate, upon verifying that electronic key 120/user 150 is associated with scheduled access permissions that authorize access at the time of engagement (e.g. assigned user has access during time of engagement), ERP 310 can instruct QP 330 to process resource qualification data. QP 330 can access or request resource qualification data from resource status database 244, for example by sending a request message via wireless communication circuit 126. Here, the message may include an instruction for resource qualification data relating to the particular resource secured by the engaged lock.

Upon receiving the resource qualification data, QP 330 can process the data and determine if the access condition is satisfied. Resource qualification data can be analyzed according to the criteria associated with the condition. QP 330 can process resource qualification data to determine whether the data meets predefined criteria, for example.

Criteria may be stored in memory 134 or other storage devices and, in various implementations, include environmental parameters such temperature ranges, moisture levels, weather conditions, and the like. For instance, if the environmental sensor is configured to measure air quality (e.g. concentration of vapor in ambient air proximate to the resource), QP 330 can analyze the resource qualification data to determine if air quality measurements indicate that vapor concentrations at or near the resource exceed the lower flammability limit for the particular substance. Accordingly, the condition criteria in this example may be met if the vapor concentrations are below the lower flammability limit. However, if QP 330 determines that environmental data is indicative of a dangerous state, QP 330 can determine that the access condition is not satisfied, and generate a response for ERP 310 including an instruction to deny access (i.e. forego initiating the unlocking event). In this situation, key controller 130 may decline to initiate the unlocking event based on failure of the dynamic condition. However, it will be appreciated that the particular user requesting access may, in some embodiments, be an emergency responder trained to address the particular hazard and that ERP 310 may, accordingly, grant access to the user regardless of whether QP 330 determines that the dynamic condition is satisfied. ERP 310 may, however, alert the emergency responder that the resource presents a danger or risk, for example by actuating alarm 128 or transmitting a message to smart device 160 (e.g. for display on a display screen) or other access control devices.

In some implementations, resource qualification data can be processed independently of and override scheduled access permissions. In other words, if a dynamic condition corresponding to resource qualification data is failed or not satisfied, access can be denied regardless of whether the user was authorized to initiate the unlocking event according to the user's scheduled access permissions. In other embodiments, resource qualification data can override access permissions only for certain users. For example, as described above, an emergency responder may be permitted access to the resource even if the dynamic condition failed. As such, it will be appreciated that the dynamic condition can be implemented as a safeguard for standard users and may selectively permit access to users with specialized training for addressing an environmental hazard or other danger. Other configurations for selectively granting and denying access based in part on dynamic resource conditions are within the scope of this disclosure. For example, in some embodiments dynamic conditions can be implemented according to temporal criteria. To illustrate, upon initial startup or deployment of certain machinery, access to the machinery can be subject to a dynamic condition for a predetermined period, such as 1 hour, as the machinery may present additional risk during this initialization period. In other implementations, a user may be subject to an expiring condition, such as configurations where dynamic conditions only apply during an employee's first six months of employment. Other variations and configurations are suitable.

Figure 7:
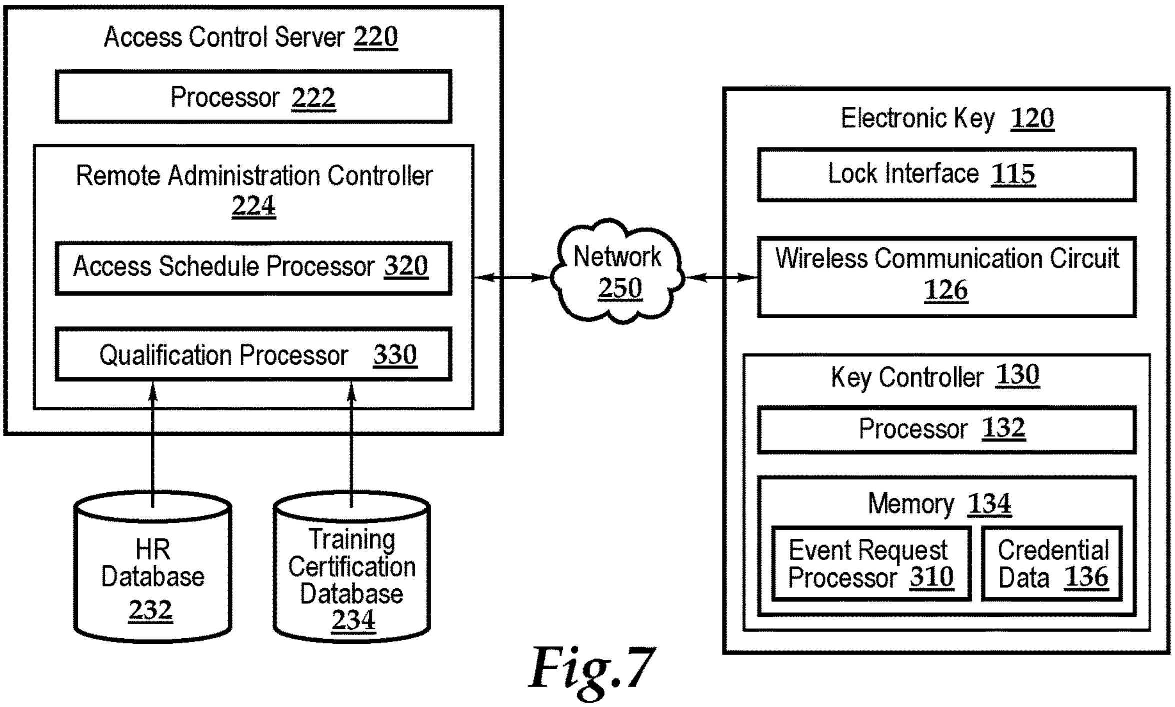
FIG. 7 is a block diagram illustrating example communications between an access control server and an electronic key.

Some or all of the operations performed by AVE 300 may be distributed among one or more software-based modules and across one or more access control devices. For example, as described above, ERP 310, ASP 320, and QP 330 can be integrated as a single software program or routine, or distributed across many more software elements. Likewise, elements of AVE 300 can be distributed across one or more other access control devices. To illustrate one example, electronic key 120 may be simplified (e.g. having less intensive circuitry requirements) where features of AVE 300 are implemented in connection with access control server 220. Turning now to FIG. 7, a block diagram illustrates an example access control server 220 comprising a processor 222, and remote administration controller 224 that includes all or portions of ASP 320 and QP 330. Access control server 220 may also include HR database 232 and TC database 234.

Access control server 220 can exchange access control information with electronic key 120 according to the communication circuitry and protocols described in this disclosure. For instance, access control server 220 can be connected to network 250 via wired or wireless interfaces. Various configurations are possible to facilitate the exchange of access control information via network 250. Access control server 220 can be connected to the Internet via an ISP, in various embodiments. Network 250 may comprise a cellular LTE Internet network and electronic key 120 can connect via wireless communication circuit 126 to access information made available by access control server 220. Other communication paradigms and hardware are possible. For instance, wireless communication circuit 126 may be implemented to provide WPAN communications and electronic key 120 can establish a wireless communications link with a proximate device, such as smart device 160. Here, smart device 160 may be a smartphone having both WWAN circuitry (e.g. LTE) and WPAN circuitry (e.g. Bluetooth). Access control server 220 can deliver access control information to smart device 160 via a cellular LTE Internet communications link for subsequent access by electronic key 120 through a Bluetooth communications or other short-range communications link.

In accordance with various embodiments, key controller 130 can respond to an engagement event by determining if the electronic key 120 is authorized to access electronic lock 110. To illustrate, upon detecting an engagement event via lock interface 115, access control information can be exchanged between lock and key. ERP 310 can verify if electronic key 120 is authorized to access the lock, for example by comparing the lock ID with a list of accessible locking devices maintained in memory 134. If electronic key 120 is authorized to access the lock, ERP 310 may transmit details related to the engagement event to access control server 220 via network 250. The engagement event details may include the lock ID, timestamp, and other data. In various implementations, elements of access control server 220 can perform one or more operations of AVE 300. Remote administration controller 224 may receive and process the engagement event details before generating a response for transmission to electronic key 120.

To illustrate, remote administration controller 224 can, via a request to ASP 320 for instance, determine if the key is authorized to access lock 110 at the time of the access attempt. ASP 320 can reference user data, for instance by correlating user identifier 152 with data stored in HR database 232, to identify access schedule information associated with the current user 150 of electronic key 120. In alternative embodiments, key 120 may be assigned a fixed schedule, regardless of the present user. In such implementations, ASP 320 may simply reference access schedule information associated with the key (e.g. via a device identifier). If electronic key 120 initiated the engagement event within an authorized time period according to the applicable user or device schedule, remote administration controller 224 can generate a response message including an instruction to initiate the unlocking event. Upon receiving the response message from access control server 220, key controller 130 can initiate the unlocking event in accordance with the response message.

Access control server 220 may be configured to process and evaluate a dynamic condition. Referring still to FIG. 7, remote administration controller 224 can process engagement event details received from electronic key 120. If remote administration controller 224 determines that access to the particular resource secured by the engaged lock is subject to a dynamic condition, the controller can request QP 330 to evaluate the condition. For instance, the particular lock 110 engaged by key 120 may be configured to protect a hazardous resource subject to a dynamic condition based on user training criteria. QP 330 can process data maintained in TC database 234 to evaluate whether or not the present user of electronic key 120 satisfies the dynamic condition. If QP 330 determines that the user satisfies the condition (e.g. has completed requisite training), remote administration controller 224 can generate a response message including an instruction to initiate the unlocking event. The response message can be transmitted to electronic key 120 to facilitate an occurrence of the unlocking event.

Access control server 220 can enrich access control information for various purposes. For instance, access control server 220 can write additional details to TC database 234 to document that the user requested access to a resource based on the training data. Access control server 220 may generate audit trail data related to the unlocking event for maintaining in memory sites of the server, remote cloud storage, or storage in memory sites of other access control devices. Access control server 220 may generate alert messages for delivery to system administrators or training providers. Further, access control server 220 may include a dynamic condition expiration time with the response message to electronic key 120. In this manner, access control server 220 can instruct the key to deny access to resources associated with the dynamic condition after the expiration, for instance where key 120 may not have connectivity to network 250. For instance, if QP 330 calculates that the user's training credentials will no longer be valid at the end of the current week, access control server 220 can instruct the key to record the training credential expiration time/date in memory 134. Thereafter, ERP 310 may reference the expiration value when processing an engagement event and automatically deny access the following week. Electronic key 120 may then be required to again connect to access control server 220 to verify user 150 completed the required training before access will again be permitted.

In other examples, access control server 220 may be configured to evaluate or analyze dynamic conditions periodically and push the result to electronic key. Here, access control server 220 may process condition data for all electronic keys 120 or users 150 in access control system 100. Access control server 220 can process data related to dynamic conditions once per hour, daily, or once a week, for example. The results of processing dynamic conditions (e.g. whether the condition is satisfied or not) can be transmitted to each of electronic keys 120 and information related to the status of the dynamic condition can be stored in memory 134. Here, the periodic results pushed to the key by access control server 220 can be associated with an expiration. For example, the expiration may correspond with the frequency that access control server 220 processes the dynamic conditions (e.g. daily). In such implementations, ERP 310 may access condition data stored in memory 134 to determine if a dynamic condition is satisfied. If the condition data has expired, electronic key 120 may receive updated access condition data from access control server 220. As such, various distributed implementations may trade off real-time condition processing for improved responsiveness during engagement events (e.g. faster communications between lock and key). In other words, evaluation of dynamic conditions can be processed independently of engagement events, for example periodically at the beginning of each day, and remain valid until the next evaluation. However, it will be appreciated that such implementations may not respond to changes in dynamic conditions until the next periodic evaluation is completed. If the period between processing is long, such as monthly, this delay may be untenable. If conditions are unlikely to change within the time period between evaluations (e.g. daily), such implementations may improve system performance, for example by reducing the time to process engagement events. Skilled persons will appreciate that dynamic conditions can be evaluated as desired, including in real-time (i.e. in connection with the engagement event), periodically, in response to another event (e.g. security breach, qualification expiration), or upon request from a user or administrator.

Other types of access control information can be generated, exchanged, and maintained by access control server 220. Similarly, the operations and functions described with respect to AVE 300, ERP 310, ASP 320, and QP 330 can be distributed among the various access control devices in different configurations. For instance, QP 330 can be a cloud-based resource and access control server 220 or electronic key 120 can access QP 330 via an Internet connection facilitated by network 250. In some implementations, QP 330 can be a third-party resource. For instance, QP 330 can be implemented as a web service maintained by a training provider and configured for server 220, key 120, or other access control devices to access the service as a client in a client-server relationship by sending XML messages to QP 330. Other variations are within the scope of this disclosure.

In other embodiments, processing associated with access events can further be distributed across devices to facilitate simplified or faster responses to engagement events between key and lock. For instance, access control server 220 can be configured to dynamically process scheduled access permissions based on evaluation of one or more dynamic conditions. In other words, access control server 220 can adjust scheduled access for each resource based on evaluation of the applicable dynamic condition(s). In such implementations, access control server 220 may, for instance, push the adjusted scheduled access permission data to electronic keys 120 upon evaluating the dynamic conditions. To illustrate with reference to the maintenance staff example described above, access control server 220 can be configured to monitor user training data to detect changes that may impact a dynamic condition associated with HVAC resources. Upon detecting that a particular user 150 failed to maintain the requisite training certification, access control server 220 can adjust scheduled access permissions for user 150 to revoke permissions for any lock 110 associated with an HVAC system resource. Access control server 220 can push the adjusted scheduled access permissions to a key assigned to user 150 to enforce the dynamic condition. If access control server 220 is configured to evaluate dynamic conditions for users of access control system 100 with a frequency that corresponds to anticipated changes in dynamic conditions, for example daily in the user training expiration example, or in response to a scheduled expiration, responsiveness of the system can be enhanced by adjusting scheduled access permissions as changes occur. Skilled persons will appreciate that other methodologies, authentication processes, and permission structures can be used by access control system 100 to selectively grant or deny access in accordance with the scheduled access permissions and dynamic condition analysis.

Figure 8:
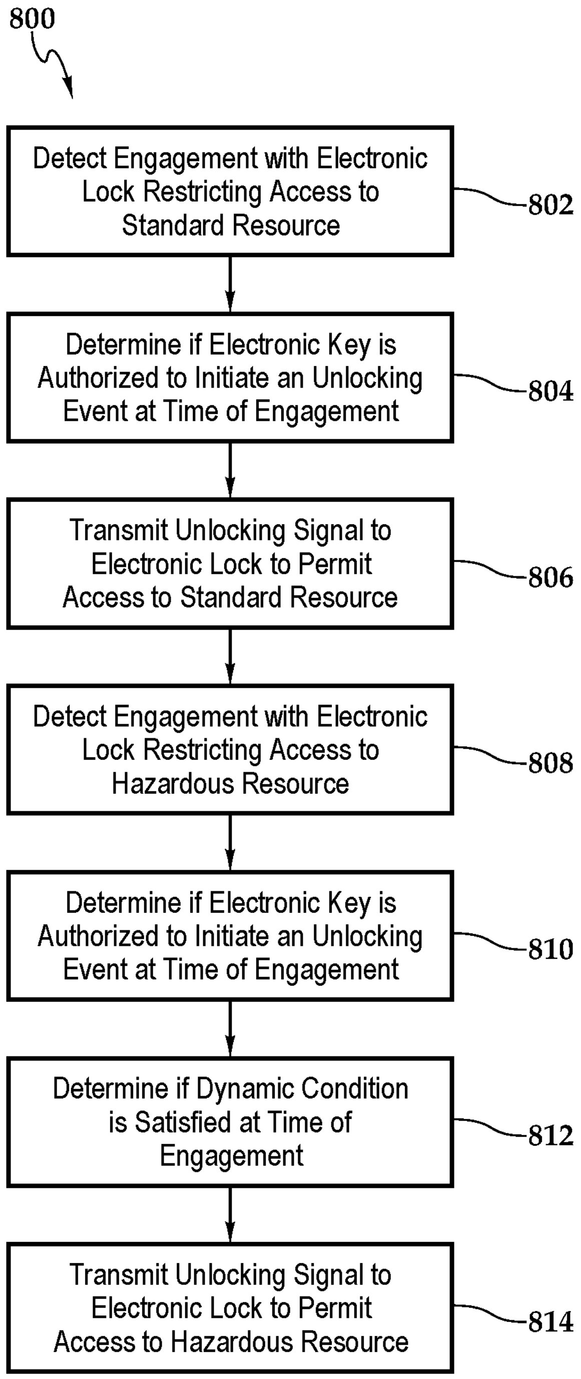
FIG. 8 is a flowchart diagram illustrating a process for administering access to two or more resources of different types.

Turning now to FIG. 8, a flow diagram of a process 800 for granting access to different types of resources is shown, according to some embodiments. Process 800 can be performed by key controller 130 of electronic key 120, for example, and more specifically AVE 300. As described above, certain operations can be distributed across one or multiple elements of AVE 300, or across multiple devices (e.g. smart device 160 or access control server 220). Process 800 is shown to include detecting an engagement event with a first electronic lock 110 that is configured to restrict access to a resource not subject to a dynamic condition (step 802). For example, the resource can be a standard resource 510 or harmless resource 610. Resources that are not subject to one or more dynamic conditions are generally resources that may be accessed by any and all users of access control system 100. It will be appreciated however that standard or harmless resources can be different types of resources, for example resources that are rarely accessed by users, such as a remote storage shed.

Key controller 130 can be configured to detect an engagement event in step 802, for example by monitoring signals received via lock interface 115. As described with reference to FIG. 2, lock interface 115 can include one or more electrical contacts 122 and an engagement event can be initiated by causing electrical contacts 122 to contact or electrically couple with electrical contacts 112 of electronic lock 110. Establishing a communication link between lock 110 and electronic key 120 through other circuitry (e.g. wireless) can also initiate an engagement event and key controller 130 may detect the event by monitoring signals generated by or received from the appropriate circuitry (e.g. wireless communication circuit 126).

Upon detecting an engagement event, key controller 130 can process the event and determine whether electronic key 120 is authorized to initiate an unlocking event as of the time the engagement event was initiated (step 804). AVE 300 can process data associated with the engagement event to determine if access is authorized in accordance with access permissions. For instance, ERP 310 may simply compare a device identifier (e.g. lock ID) against a list of accessible devices. Where a user is assigned to (i.e. issued) electronic key 120, ERP 310 may determine if the current user has been granted access to the locking device. Additionally, ERP 310 may process schedule data to determine if the engagement event was initiated during a valid time period in accordance with the user's scheduled access permissions. Other operations can be performed to evaluate access permissions relating to lock 110 and the corresponding resource.

If AVE 300 concludes that electronic key 120 is authorized to access the lock at the time of the access attempt, AVE 300 can generate an unlocking signal and key controller can transmit or emit the unlocking signal in step 806. The unlocking signal can convey an access credential (e.g. password, passcode, encrypted password, device identifier, or other information) to electronic lock 110 to initiate an unlocking event. AVE 300 and/or key controller 130 can generate the unlocking signal based on credential data 136 stored in memory 134. Key controller 130 can process other information (e.g. encryption key) in connection with generating and transmitting the unlocking signal. The unlocking signal can be transmitted via lock interface 115. For instance, if lock interface 115 comprises electrical contacts 122, unlocking signal can be transmitted in any form appropriate for conveyance via a wired communications link. If lock interface 115 comprises wireless communications circuitry, the unlocking signal may be formatted according to a standard Bluetooth, infrared, or NFC protocol, for example. Upon receipt of a valid unlocking signal (e.g. access credential), electronic lock 110 may initiate an unlocking event, for example by causing or permitting displacement of a locking mechanism (e.g. actuating a solenoid or motor) or other element restricting access to the resource.

Process 800 is shown to further include detecting an engagement event with a second electronic lock 110 that is configured to restrict access to a resource that is subject to a dynamic condition (step 808). Key controller 130 can process engagement event information to identify if the electronic lock 110 is associated with a resource subject to a dynamic condition. For instance, a list of electronic locks 110 subject to a dynamic condition can be maintained in memory 134. Alternatively, electronic lock 110 can transmit information related to the dynamic condition to electronic key 120 during the engagement event. Electronic lock 110 may maintain a variable or instruction in memory sites of the lock and receipt of the variable or instruction at electronic key 120 may alert AVE 300 that the lock is subject to one or more dynamic conditions.

In step 810, key controller 130 can process the event and determine whether electronic key 120 is authorized to initiate an unlocking event at the time the engagement event was initiated (e.g. by processing the access attempt against scheduled access permissions). Key controller 130 can perform operations analogous to those described above with respect to step 804. Alternatively, according to some implementations, if electronic lock 110 is subject to a dynamic condition, the process in step 810 may vary from 804. AVE 300 may process engagement event information to determine if the dynamic condition is satisfied at the time of the access attempt or engagement (step 812). To illustrate, if the dynamic condition is based on employment criteria, such as a user having a specific title (e.g. maintenance specialist 3) or experience, AVE 300 can access user qualification data including an employee title. For example, QP 330 can access data maintained in HR database 232 to evaluate if the user possesses the required title (i.e. promotion level) for accessing the desired resource.

In some embodiments, a resource can be subject to a plurality of dynamic conditions. Access can be administered based on one, all, or combinations of the plurality of dynamic conditions. Access to a resource may be subject to a user-related condition and a resource-related condition, for example. In other aspects, access can be subject to tens or even hundreds of conditions, all of which or combinations of which must be satisfied to facilitate access. In such examples, access to the resource may require both that the user maintain a current training certificate and that the resource is in a safe state (e.g. based on environmental data) for access. Alternatively, access may be based on one or the other dynamic conditions being satisfied. For example, the resource may be in a dangerous state at the time of the access attempt, however if the user possesses a current training certificate for the resource, access can be granted. Similarly, where the user does not possess a current training certificate, access may still be granted during periods that resource is in a safe state or mode.

In some embodiments, access to a resource may require the user to possess a complex combination of qualifications, including security clearances, employment title, background checks, training certificates, job experience milestones, education, absence of violations or behavior issues, and the like.

Different criteria can be used in various implementations. Such user qualifications can be integrated with a similarly complex set of resource qualifications, for example temperature, vapor concentration, operational states, absence of previous mechanical issues, and other attributes. It will be appreciated that a plurality of conditions can be represented as a matrix where access is granted in accordance with specific combinations of satisfied and/or failed conditions. Skilled persons will recognize that data associated with conditions can be processed in various different ways and that evaluation of access conditions may comprise any desired combination of one or more Boolean operators, logic rules, pattern recognition techniques, and the like.

Upon a determination in step 810 that electronic key is authorized to initiate an unlocking event according to both scheduled access permissions and a determination in step 812 that one or more access conditions are satisfied, key controller 130 can transmit an unlocking signal to the lock in step 814. It will be apparent to skilled persons that the steps depicted by FIG. 8 and described with reference thereto may be performed in an alternative order and that the specific operations may vary without departing from the scope of this disclosure. For instance, in some implementations, step 812 can be processed before step 810.

Reference throughout this disclosure to "one embodiment," "an embodiment," or similar language means that a feature, element, or characteristic described in connection with the embodiment is included in at least one embodiment of the various aspects. Accordingly, appearances of the phrases "in one embodiment," "in an embodiment," and similar language may, but do not necessarily, all refer to the same embodiment, but should be interpreted as "one or more but not all embodiments" unless expressly specified otherwise. An enumerated listing of items does not imply that any or all of the items are mutually exclusive and/or mutually inclusive, unless expressly specified otherwise. The terms "including," "comprising," "having," and variations thereof mean "including but not limited to" unless expressly specified otherwise. The terms "a," "an," and "the" also refer to "one or more" unless expressly specified otherwise.

It should be understood that as used in this disclosure and throughout the claims that follow, the phrase "A or B" means any one of (A), (B), or (A and B), which is synonymous with the phrase "A and/or B." Alternatively, just a "/" may be use for conciseness. For example, the phrase "A/B" also means "A or B." The phrase "at least one of A, B, and C" means (A), (B), (C), (A and B), (A and C), (B and C), or (A, B, and C). Further, as used in this disclosure and throughout the claims that follow, the meaning of "in" includes "in" and "on" unless the context clearly prescribes otherwise. The terms "comprising," "having," and "including" are synonymous, unless the context dictates otherwise. As used in this disclosure, the terms "conveying" and "carrying" are described with reference to information included in a communication signal and are synonymous, unless the context dictates otherwise.

Various implementations of the features described herein can be realized in circuitry that includes one or more processing devices, such as ICs, microchips, microprocessors, controllers, microcontrollers, general purpose processors, special purpose processors, CPUs, DSPs, and the like, or specialized hardware such as ASICs, Programmable Logic Devices ("PLDs"), or FPGAs. The circuitry may store or access instructions for execution, or may implement its functionality in hardware alone. The instructions may be stored in a tangible storage medium that is other than a transitory signal, such as memory 134 or a memory integrated with or embedded into the processing circuitry, or other suitable storage devices including flash memory, RAM, ROM, EPROM, or on a magnetic or optical disc, such as a compact disc read only memory ("CDROM"), hard disk drive ("HDD"), or other magnetic or optical disk, or in or on another machine-readable medium. Those skilled in the art will realize that storage devices utilized to store instructions can be distributed across a network.

Moreover, the methods described in this disclosure can be carried out by machine instructions stored in or on a computer-readable medium. The instructions, when executed by one or more processors of a computing device, can cause the computing device to perform one or more steps of the method. The order in which a disclosed method or operation occurs may or may not strictly adhere to the order of the corresponding steps shown.

The implementations may be merged or distributed. For instance, the circuitry may include multiple distinct elements, such as multiple processors and memories, and may span multiple distributed processing systems or devices. Parameters, databases, and other data structures may be separately stored and managed, may be incorporated into a single memory or database, and may be logically and physically organized in different ways. Example implementations include linked lists, program variables, hash tables, arrays, records (for example, database records), objects, and implicit storage mechanisms. Instructions may form parts (e.g. subroutines or other code sections) of a single software program, may form multiple separate programs, may be distributed across multiple memories and processors, and may be implemented according to various different methodologies.

Thus, the subject matter has been described with reference to particular illustrative embodiments and implementations thereof. While this disclosure contains many specific implementation details, these should not be construed as limitations on the scope of what may be claimed, but rather as example forms of implementing the following claims. Similarly, while operations are depicted in the drawings in a particular order, this should not be understood as requiring that such operations be performed in the particular order shown or in sequential order, or that all illustrated operations be performed, to achieve desirable results. It is to be understood that many other embodiments and implementations can be devised by skilled persons without departing from the spirit and scope of the underlying principles of this disclosure. The scope of this disclosure should, therefore, be understood only from the following claims.

It is claimed:

1. An access control method, comprising:

maintaining, by an access control server, data associated with a plurality of electronic locks;

assigning, by the access control server, a user to a group;

associating, by the access control server, the group with one or more conditions;

applying, by the access control server, a rule indicating that members of the group are permitted to access a subset of the plurality of electronic locks;

issuing, by the access control server, an electronic key to the user;

transmitting, from the access control server to the electronic key, a first key configuration that permits the electronic key to unlock the subset of electronic locks;

accessing, by the access control server at a time corresponding to a training expiration date, personnel data associated with the user, the personnel data including information indicative of a competency of the user;

determining, by the access control server, whether the personnel data including information indicative of a competency of the user satisfies the one or more conditions;

responsive to determining that the one or more conditions are not satisfied, removing the user from the group; and transmitting, from the access control server to the electronic key, a second key configuration that prevents the electronic key from unlocking the subset of electronic locks.

2. The method of claim 1, wherein the one or more conditions comprise a condition relating to user training.

3. The method of claim 1, wherein the personnel data comprises information indicating the user is trained to operate an item of equipment.

4. The method of claim 1, wherein the data associated with the plurality of electronic locks is stored in an access control database; and the accessing personnel data associated with the user comprises querying a personnel database.

5. The method of claim 1, wherein the user is assigned to a group corresponding to the user's job position.

6. The method of claim 1, wherein the second key configuration that prevents the electronic key from unlocking the subset of electronic locks further permits the electronic key to unlock at least one electronic lock not included in the subset.

7. The method of claim 1, further comprising:

identifying, by the access control server, a type of asset secured by an electronic lock; and selecting, by the access control server based on the type of asset, the electronic lock to include in the subset.

8. The method of claim 1, wherein the rule is based on user input received at the access control server from a client computer.

9. A computer system comprising:

a processor; and a non-transitory computer-readable storage medium storing access control instructions, the instructions, when executed by the processor, causing the processor to perform steps including:

storing information relating to a plurality of electronic locks;

assigning an electronic key to a user;

adding the user to a group;

associating a condition with the group;

generating a rule indicating that members of the group are permitted to access a subset of the plurality of electronic locks;

accessing, at a time corresponding to a training expiration date, personnel data associated with the user;

determining whether the personnel data satisfies the condition;

responsive to determining that the condition is satisfied, transmitting, to the electronic key, a first key configuration that permits the user, as a member of the group, to unlock the subset of electronic locks; and responsive to determining that the condition is not satisfied, removing the user from the group and transmitting, to the electronic key, a second key configuration that prevents the electronic key from unlocking the subset of electronic locks.

10. An access control method, comprising:

maintaining, by an access control server, data associated with a plurality of electronic locks;

identifying, by the access control server, a type of asset secured by an electronic lock;

selecting, by the access control server based on the type of asset, the electronic lock to include in a subset of the plurality of electronic locks;

associating, by the access control server, a condition with a user group;

generating, by the access control server, a rule indicating that members of the user group are permitted to access the subset of the plurality of electronic locks;

issuing, by the access control server, an electronic key to a user;

accessing, by the access control server, personnel data related to the user, the personnel data including information indicative of a competency of the user;

determining, by the access control server, whether the personnel data including information indicative of a competency of the user satisfies the condition;

responsive to determining that the condition is satisfied, linking the user to the user group and transmitting, from the access control server to the electronic key, a first key configuration that permits the electronic key to unlock the subset of electronic locks; and responsive to determining that the access condition is not satisfied, unlinking the user from the user group and transmitting, from the access control server to the electronic key, a second key configuration that prevents the electronic key from unlocking the subset of electronic locks.

11. The method of claim 10, wherein the condition is related to user training.

12. The method of claim 10, wherein the personnel data comprises information indicating the user is trained to operate an item of equipment.

13. The method of claim 10, wherein the accessing comprises:

accessing, by the access control server at a time corresponding to a training expiration date, personnel data related to the user.

14. The method of claim 10, wherein the data associated with the plurality of electronic locks is stored in an access control database; and the accessing personnel data related to the user comprises querying a personnel database.

15. The method of claim 10, wherein the condition is related to the user's job position.

16. The method of claim 10, wherein the second key configuration that prevents the electronic key from unlocking the subset of electronic locks further permits the electronic key to unlock at least one electronic lock not included in the subset.

17. The method of claim 10, wherein the rule is based on user input received at the access control server from a client computer.

18. The method of claim 10, wherein the personnel data is accessed at a periodic interval.

* * * * *